(12) United States Patent
Choudhury et al.

(10) Patent No.: US 9,530,191 B2
(45) Date of Patent: Dec. 27, 2016

(54) METHODS AND SYSTEMS FOR DETECTION AND ESTIMATION OF MOSQUITO NOISE

(71) Applicant: Sharp Laboratories of America, Inc., Camas, WA (US)

(72) Inventors: Anustup Kumar Choudhury, Vancouver, WA (US); Christopher Andrew Segall, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/745,242

(22) Filed: Jun. 19, 2015

(65) Prior Publication Data

US 2015/0287172 A1 Oct. 8, 2015

Related U.S. Application Data

(63) Continuation-in-part of application No. 14/056,361, filed on Oct. 17, 2013, which is a continuation-in-part of application No. 12/882,763, filed on Sep. 15, 2010, now Pat. No. 8,588,535, and a continuation-in-part of

(60) Provisional application No. 61/888,463, filed on Oct. 8, 2013, provisional application No. 61/888,437, filed on Oct. 8, 2013.

(Continued)

(51) Int. Cl.
  *G06K 9/40* (2006.01)
  *G06T 5/00* (2006.01)
  *G06T 5/40* (2006.01)
  *G06T 7/00* (2006.01)
  *H04N 19/86* (2014.01)

(52) U.S. Cl.
  CPC .............. *G06T 5/002* (2013.01); *G06T 5/40* (2013.01); *G06T 7/0004* (2013.01); *H04N 19/86* (2014.11); *G06T 2207/20021* (2013.01); *G06T 2207/20192* (2013.01); *G06T 2207/30168* (2013.01)

(58) Field of Classification Search
  CPC .......... G06T 5/002; G06T 5/003; G06T 5/004; G06T 5/007; G06T 5/008; G06T 5/20; G06T 5/40; G06T 5/50; G06T 7/0004; G06T 7/002; G06T 7/004; G06T 7/0022; G06T 7/0081; G06T 7/2053; G06T 2207/20012; G06T 2207/20028; G06T 2207/20182; G06T 2207/20192; G06T 2207/30168; H04N 5/145; H04N 5/208; H04N 5/21; H04N 7/014; H04N 9/646; H04N 19/117; H04N 19/14; H04N 19/154; H04N 19/162; H04N 19/176; H04N 19/186; H04N 19/40; H04N 19/46; H04N 19/527; H04N 19/61; H04N 19/646; H04N 19/85; H04N 19/86
  See application file for complete search history.

(56) References Cited

U.S. PATENT DOCUMENTS 8,134,762 B2   3/2012  Ferman
8,175,414 B2 * 5/2012  Hsu ..................... H04N 5/213
                                                  348/607

(Continued)

*Primary Examiner* — Jose Couso
(74) *Attorney, Agent, or Firm* — J. Fish Law, PLLC

(57) ABSTRACT

Aspects of the present invention are related to systems and methods for detection and estimation of mosquito noise in an image or in a video sequence. A mosquito-noise estimate, at a pixel location, may be computed based on an image ring parameter, a statistical value of noise estimates in a first region associated with the pixel location, a maximum activity value in a second region associated with the pixel location and a noise estimate at the pixel location.

22 Claims, 24 Drawing Sheets

Related U.S. Application Data application No. 12/882,865, filed on Sep. 15, 2010, now Pat. No. 8,600,188.

(56) References Cited

U.S. PATENT DOCUMENTS

| | | | | |
|---|---|---|---|---|
| 8,532,429 B2* | 9/2013 | Segall | ............... | G06T 5/004 348/607 |
| 8,571,347 B2* | 10/2013 | Srinivasan | ............ | G06T 5/003 375/240.25 |
| 8,588,535 B2* | 11/2013 | Segall | ............... | H04N 19/86 382/232 |
| 8,600,188 B2* | 12/2013 | Segall | ............... | H04N 5/208 348/606 |
| 8,601,042 B2* | 12/2013 | Yamajo | ............ | G06T 5/002 708/300 |
| 8,842,741 B2* | 9/2014 | Schoner | ......... | H04N 19/00909 375/240.27 |
| 8,953,880 B2* | 2/2015 | Kita | ................ | G06T 5/002 382/167 |
| 2006/0171473 A1 | 8/2006 | Schoner | | |
| 2009/0304284 A1 | 12/2009 | Kempf | | |
| 2011/0177841 A1 | 7/2011 | Attwood | | |
| 2012/0076430 A1 | 3/2012 | Segall | | |

* cited by examiner

METHODS AND SYSTEMS FOR DETECTION AND ESTIMATION OF MOSQUITO NOISE

CROSS REFERENCE TO RELATED APPLICATIONS

This application is a continuation-in-part of U.S. patent application Ser. No. 14/056,361, entitled "Methods and Systems for Estimation of Additive Noise," filed on Oct. 17, 2013, invented by Anustup Kumar Choudhury and Christopher A. Segall, U.S. patent application Ser. No. 14/056,361 is a continuation-in-part of U.S. patent application Ser. No. 12/882,763, entitled "Methods and Systems for Estimation of Compression Noise," filed on Sep. 15, 2010, U.S. Pat. No. 8,588,535, invented by Christopher A. Segall, and U.S. patent application Ser. No. 14/056,361 is also a continuation-in-part of U.S. patent application Ser. No. 12/882,865, entitled "Methods and Systems for Noise Reduction and Image Enhancement," filed on Sep. 15, 2010, U.S. Pat. No. 8,600,188, invented by Christopher A. Segall, and U.S. patent application Ser. No. 14/056,361 also claims the benefit of U.S. Provisional Application No. 61/888,463, filed Oct. 8, 2013, and U.S. patent application Ser. No. 14/056,361 also claims the benefit of U.S. Provisional Application No. 61/888,437, filed Oct. 8, 2013; said applications, U.S. patent application Ser. No. 14/056,361, U.S. patent application Ser. No. 12/882,763, U.S. patent application Ser. No. 12/882,865, U.S. Provisional Application No. 61/888,463 and U.S. Provisional Application No. 61/888,437, are hereby incorporated by reference herein, in their entirety.

FIELD OF THE INVENTION

The present invention relates generally to image and video processing and, in particular, to methods and systems for detection and estimation of ringing artifacts/mosquito noise in a still image or in an image frame in a video sequence.

BACKGROUND

The quality of a video sequence or of a still image may vary widely depending on a number of factors such as the data source, transmission capabilities, storage properties, display characteristics and other factors. For example, computer-generated content may be of the highest quality. Packaged media content, for example, Blu-ray media, may be of relatively high quality. Over-the-air high-definition (HD) broadcast content may be of relatively intermediate quality, while content distributed via cable and satellite, may be of a relatively lower quality. Internet protocol television (IPTV) and streamed content may be of relatively low quality. Methods and systems for video and image enhancement that automatically adapt to image- or video-content quality may be desirable. Additionally, methods and systems for detection and estimation of mosquito noise in an image or in a video sequence may be desirable.

SUMMARY

Some embodiments of the present invention comprise methods and systems for estimation of mosquito noise at a pixel location in an image or in a frame of a video sequence.

According to a first aspect of the present invention, a ring parameter may be computed for an image.

According to a second aspect of the present invention, a statistical value may be computed from a plurality of noise estimates in a first region associated with the pixel location.

According to a third aspect of the present invention, a maximum activity value may be computed for a second region associated with the pixel location.

According to a fourth aspect of the present invention, a mosquito-noise estimate at the pixel location may be set to a combination of the computed statistical value, a noise estimate at the pixel location and a product of the maximum activity value, the ring parameter and a multiplicative constant. In some embodiments, the combination may be the maximum of the computed statistical value, the noise estimate at the pixel location and the product of the maximum activity value, the ring parameter and the multiplicative constant.

According to a fifth aspect of the present invention, the multiplicative constant may be determined based on the maximum activity value.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 28:
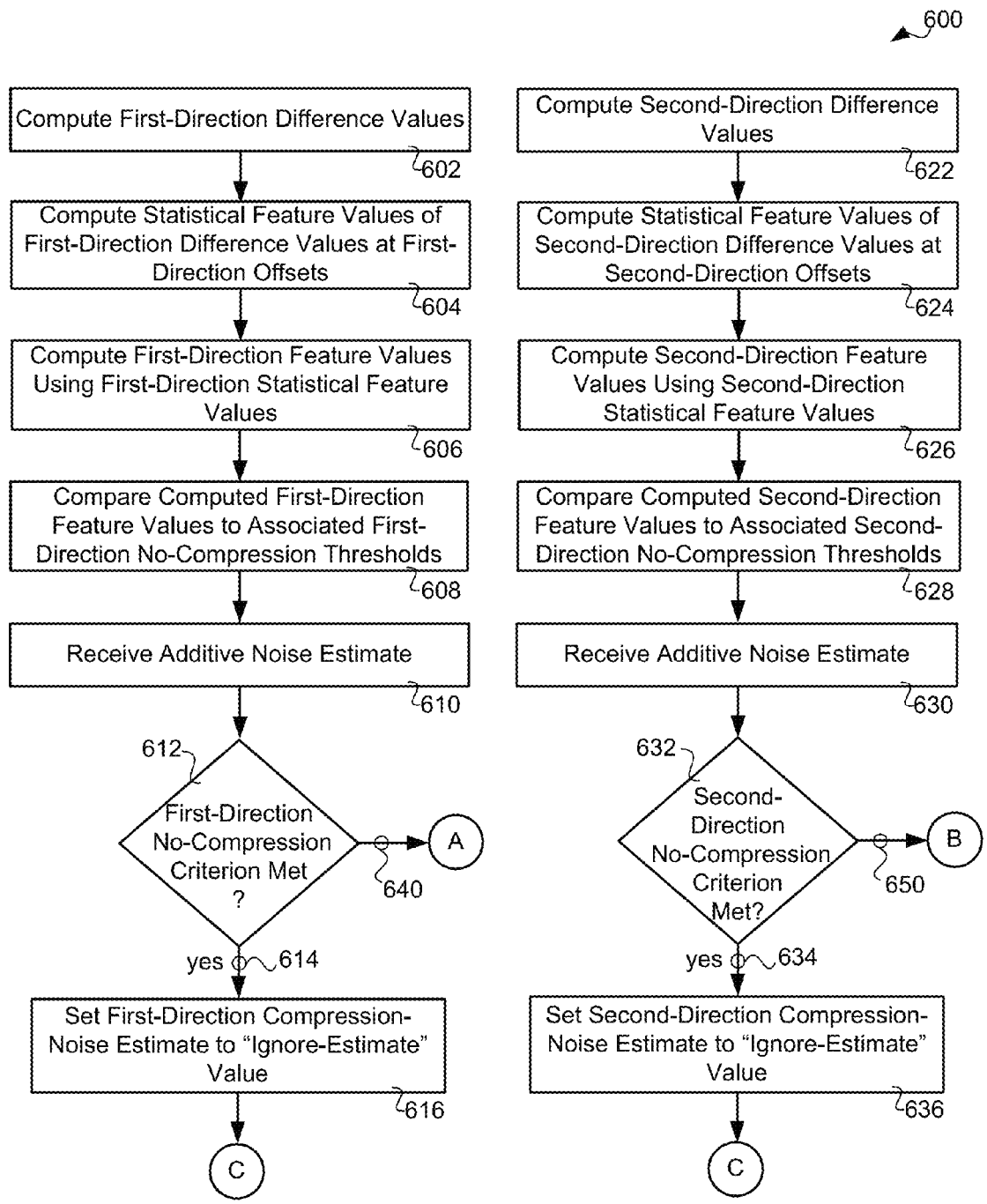
Figure 28:
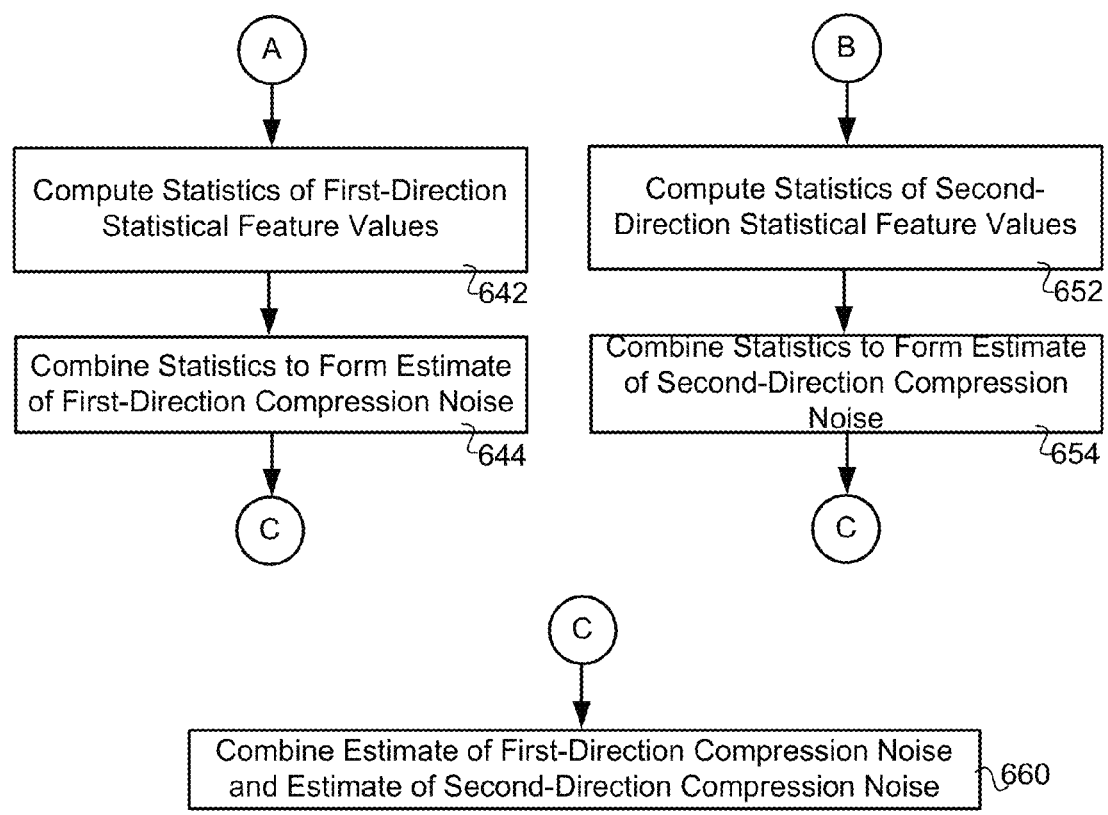
Figure 29:
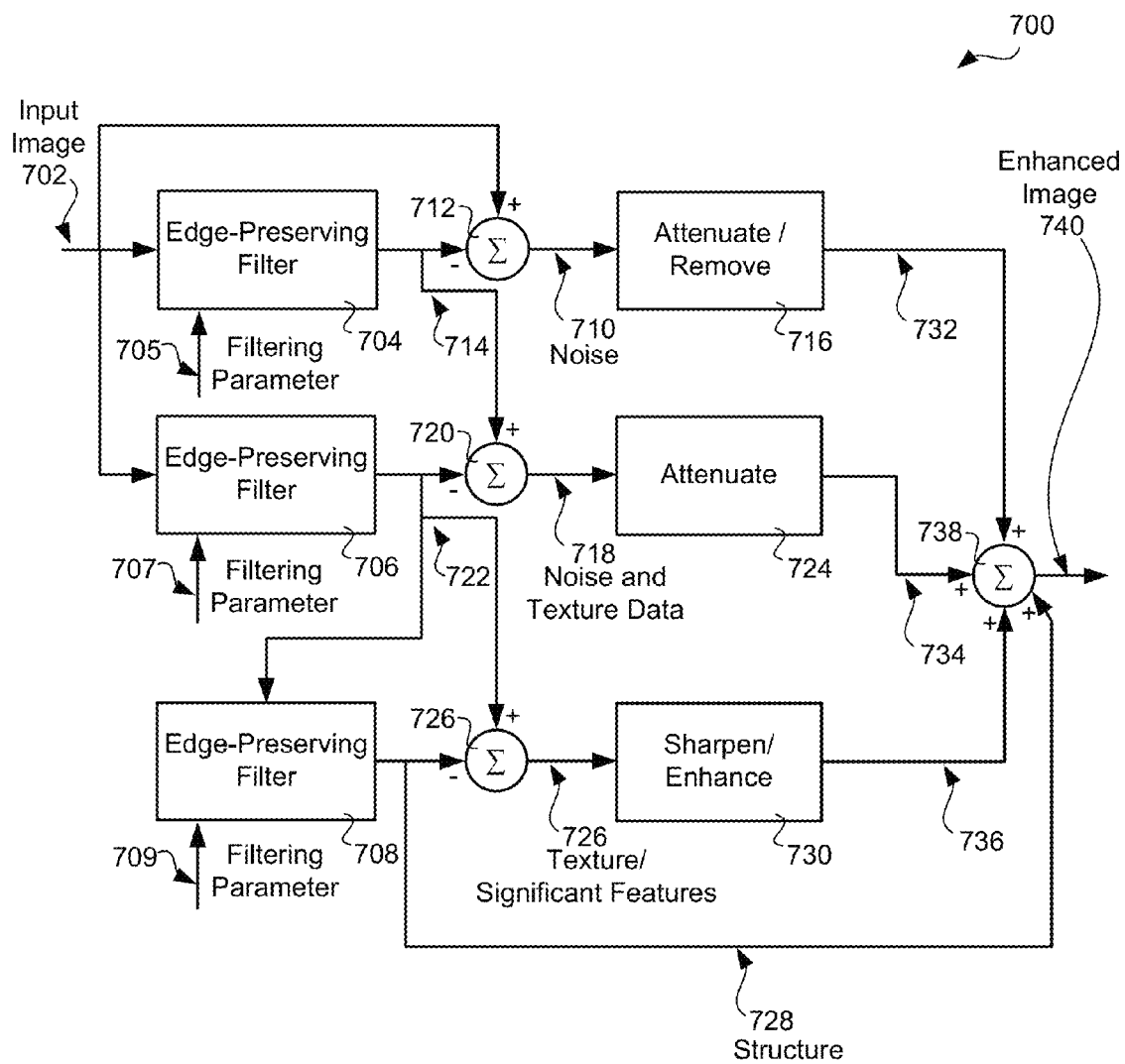
Figure 30:
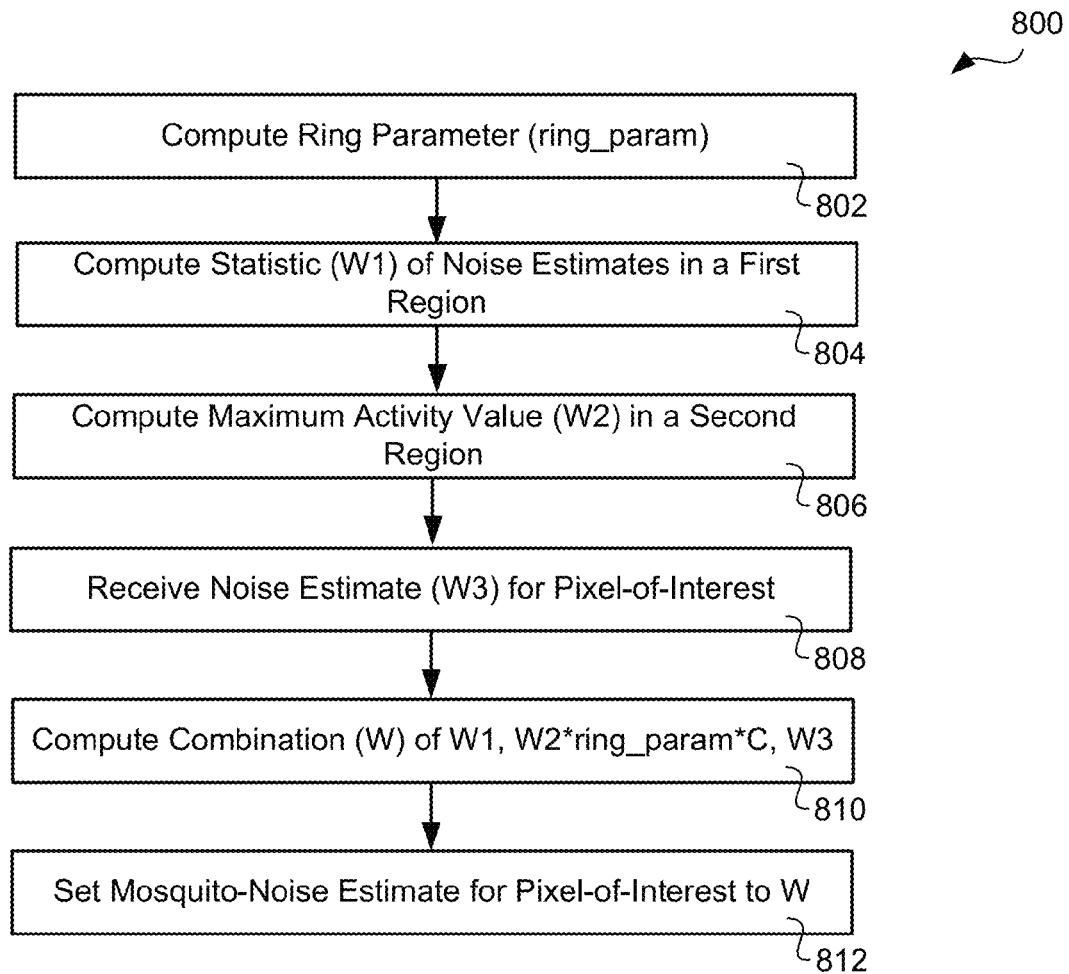
Figure 31:
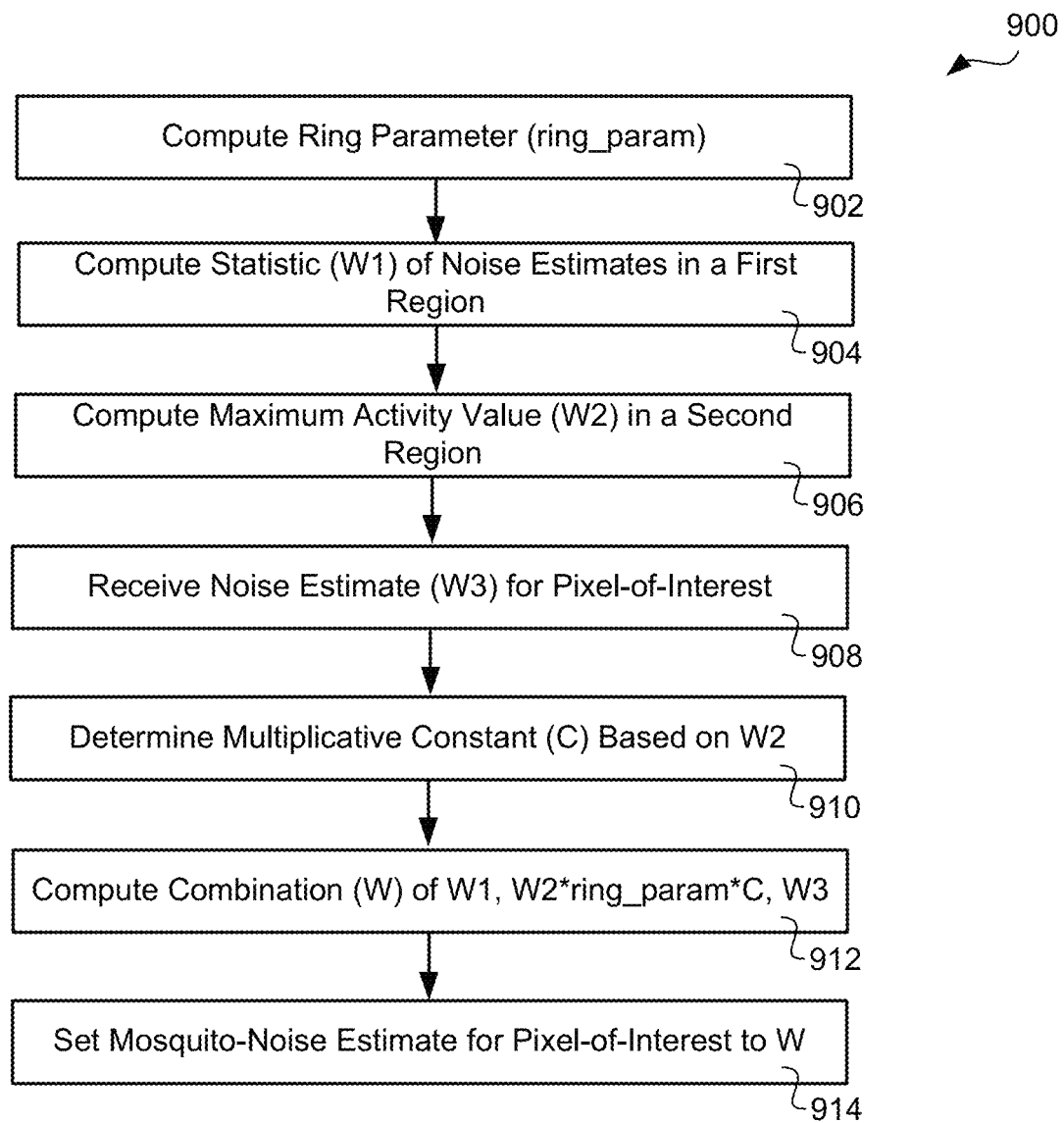

FIG. 28 is a chart showing exemplary embodiments of the present invention comprising methods for estimating compression noise in accordance with a first criterion based on at least one feature value computed from statistical feature values corresponding to offsets in a first direction in a first-direction difference image and an additive noise estimate and a second criterion based on at least one feature value computed for statistical feature values corresponding to offsets in a second direction in a second-direction difference image and the additive noise estimate;

FIG. 29 is a picture depicting exemplary embodiments of the present invention comprising a hierarchy of edge-preserving filters, wherein the image separation effectuated by the hierarchy of edge-preserving filters is controlled based on an estimate of the noise in the input image;

FIG. 30 is a chart showing exemplary embodiments of the present invention comprising methods for estimating mosquito noise, at a pixel location, based on an image ring parameter, a statistical value of noise estimates in a first region associated with the pixel location, a maximum activity value in a second region associated with the pixel location and a noise estimate at the pixel location; and FIG. 31 is a chart showing exemplary embodiments of the present invention comprising methods for estimating mosquito noise, at a pixel location, wherein a multiplicative constant may be determined based on a maximum activity value in a region associated with the pixel location.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of a plurality of actions depicted by a corresponding plurality of blocks in a figure may be changed relative to the shown order. Also, as a further example, two or more actions depicted in blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

The quality of a video sequence or of a still image may vary widely depending on a number of factors such as the data source, transmission capabilities, storage properties, display characteristics and other factors. For example, computer-generated content may be of the highest quality. Packaged media content, for example, Blu-ray media, may be of relatively high quality. Over-the-air high-definition (HD) broadcast content may be of relatively intermediate quality, while content distributed via cable and satellite, may be of a relatively lower quality. Internet protocol television (IPTV) and streamed content may be of relatively low quality. Methods and systems for video and image enhancement that automatically adapt to image- or video-content quality may be desirable. Additionally, methods and systems for detection and estimation of mosquito noise in an image or in a video sequence may be desirable.

When there is little, or no, noise in an image, either a still image or an image frame in a video sequence, the image may be sharpened aggressively, and small details in the image may not be attenuated. However, selective image sharpening may be required in the presence of noise. Stronger and larger-scale features, as defined relative to the degree of noise, may be identified and enhanced, while less significant and smaller-scale features may be unprocessed, or potentially attenuated to mitigate the noise present in the image.

U.S. patent application Ser. No. 12/228,774, entitled "Image Sharpening Technique," filed Aug. 15, 2008, which is hereby incorporated by reference herein in its entirety, describes a technique for image sharpening wherein two image channels are generated from an image: a first channel which may include primarily texture information and a second channel which may include primarily edge and flat-region information. The first channel may be filtered to attenuate higher frequency content of the image in the first channel, and the second channel may be filtered to sharpen the image in the second channel. The filtered first channel and the filtered second channel may be combined to form an enhanced image associated with the input image.

In some embodiments of the present invention, an edge-preserving filter may be used to separate an input image into two channels: a first channel which may comprise image content to be sharpened; and a second channel which may comprise image content to attenuate. In some embodiments of the present invention, the edge-preserving filter may comprise a bi-lateral filter. In alternative embodiments, another edge-preserving filter may be used to perform the separation. In some embodiments, the assignment of the input-image content to the first channel and the second channel may be controlled by a parameter of the edge-preserving filter. For example, a range sigma parameter of a bi-lateral filter may control the assignment of input-image content to the first channel and the second channel in embodiments wherein the edge-preserving filter comprises a bi-lateral filter. In some embodiments, in order to maximize the amount of sharpening, the filter parameter value, for example, the range sigma parameter value in a bi-lateral filter, may be set based on noise statistics associated with the input image.

Figure 1:
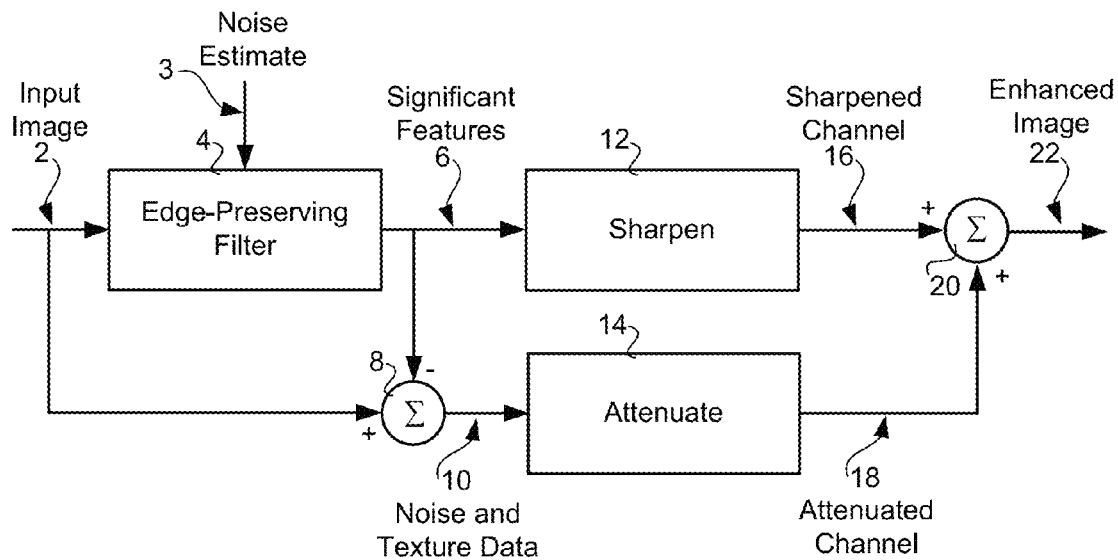
FIG. 1 is a picture depicting exemplary embodiments of the present invention comprising controlling the image separation effectuated by an edge-preserving filter using an estimate of the noise in the input image.

Some embodiments of the present invention may be understood in relation to FIG. 1. An input image 2 and a noise estimate 3 associated with the input image 2 may be made available to an edge-preserving filter 4. In some embodiments of the present invention, the edge-preserving filter may comprise a bi-lateral filter. In alternative embodiments, another edge-preserving filter may be used to perform the separation. The edge-preserving filter 4 may be used to divide the input image 2 into two channels 6, 10. A first channel 6 may correspond to significant features in the input image 2, and the second channel 10, formed by removing 8 the first channel 6 from the input image 2, may contain the residual difference between the first channel 6 and the input image 2. The residual difference may comprise noise and texture data. The first channel 6 may be sharpened 12, and the second channel 10 may be attenuated 14. The sharpened channel 16 and the attenuated channel 18 may be combined 20 to form an enhanced image 22. The value of a filter parameter of the edge-preserving filter 4 may control the assignment of input-image content to the first channel 6 and the second channel 10. The value of the filter parameter of the edge-preserving filter 4 may be based on the noise estimate 3. In some embodiments of the present invention, the value of the filter parameter may be proportional to the noise estimate 3. However, the value of the filter parameter may not be equal to zero. In some embodiments, when the noise estimate 3 indicates that the filter parameter should be set to zero, a small, pre-determined value may be assigned to the filter parameter. In alternative embodiments, when the noise estimate 3 indicates that the filter parameter should be set to zero, the edge-preserving filter 4 may pass the input image 2 directly through as the first channel 6, thereby effectuating only sharpened data. In some embodiments of the present invention (not shown), the enhanced image 22 may be up-sampled to a resolution greater than that of the input image 2.

Multiple noise processes may appear in an image or video sequence. At one extreme, an original image may be of very high quality, for example, computer generated imagery. However, other images, or video sequences, may be of lower quality, for example, a sequence or image may be corrupted, during the acquisition process by thermal, sensor, or other noise. In some situations, film grain, or other analog noise, may corrupt an image or video sequence. Furthermore, compression artifacts may corrupt an image or video sequence. The degree of compression artifacts may be related to the bit-rate associated with a video sequence or image. Exemplary bit-rates and quality levels may be high quality Blu-ray discs compressed at approximately 40 Mbps (Mega bits per second), lower quality over-the-air transmissions compressed at approximately 20 Mbps, further lower quality trans-coded cable transmissions compressed at approximately 12 Mbps and lowest quality satellite and IPTV services compressed at less than 10 Mbps.

Figure 2:
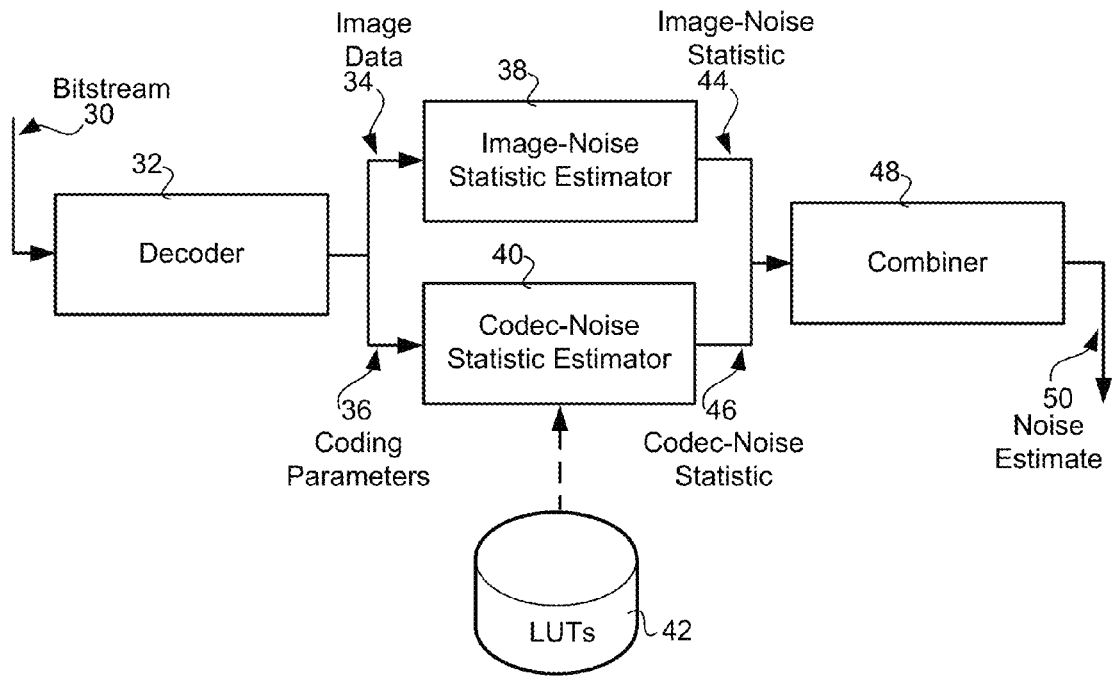
FIG. 2 is a picture depicting exemplary embodiments of the present invention comprising estimation of compression noise by accessing a look-up table.

In some embodiments of the present invention described in relation to FIG. 2, an input bitstream 30, associated with a still image or a video sequence, may be decoded by an appropriate decoder 32. The image data 34 may be made available, to an image-noise statistic estimator 38, from the decoder 32, and the decoded coding parameters 36 may be made available, to a codec (coder/decoder)-noise statistic estimator 40, from the decoder 32. In alternative embodiments, the coding parameters 36 may be made available to the codec-noise statistic estimator 40 through meta-data or other external means.

The image-noise statistic estimator 38 may analyze the image data 34 to determine the amount of thermal, sensor, grain, or other image noise present in the image data 34. Many existing methods are known in the art for estimating the image noise present in image data. In an exemplary embodiment of the present invention, the image-noise statistic estimator 38 may identify one, or more, substantially smooth regions in the image data 34 and may calculate the standard deviation of the pixel values within each region. The maximum standard-deviation value may be associated with an image-noise statistic 44.

The codec-noise statistic estimator 40 may receive coding parameters 36 associated with the input bitstream 30. In some embodiments, the coding parameters 36 may comprise the quantization interval used for coding the current slice or frame in a video sequence. In alternative embodiments, the coding parameters 36 may comprise the number of bits used to represent the source data. The coding parameters 36 may be used in a look-up operation to determine the amount of noise due to compression. In some embodiments of the present invention, the codec type may be used to select a look-up table from multiple, pre-computed look-up tables 42. The coding parameters 36 may be used as an index into the selected table, and the output may be a measure of the image noise due to compression 46. The measurement provided by the look-up tables 42 may be normalized, either at the time the look-up tables 42 are created or in a post-processing operation (not shown) to have the same units of measurement as the noise estimate 44 provided by the image-noise statistic estimator 38.

In some embodiments of the present invention, a look-up table 42 may be constructed by selecting multiple images and video sequences that are representative of input data. The images and videos sequences may be compressed using a variety of codecs and codec settings, and each result may be subsequently decoded. The decoded results may be compared to the original data, and the noise due to the compression system may be computed, for example, the standard deviation of the error. This computation may be performed over all images and video sequences that are compressed using the same codec and parameter settings, and the result may be stored in the look-up table as the noise statistic for the combination of codec and codec parameter settings. In some embodiments, if additional values are needed, the test image and video sequence data may be compressed with the desired configuration settings. In alternative embodiments, noise statistics may be interpolated from values with a similar compression configuration.

The image-noise statistic 44 and the codec-noise statistic 46 may be combined by a combiner 48 to produce a final noise estimate 50, which may be made available to the edge-preserving filter to control the filter parameter. In one embodiment of the present invention, the maximum of the image-noise statistic 44 and the codec-noise statistic 46 may be assigned to the noise estimate 50. Alternative fusion methods for combining 48 the image-noise statistic 44 and the codec-noise statistic 46 may be used to produce a final noise estimate 50 which may be made available to the edge-preserving filter, and the value of the filter parameter of the edge-preserving filter may be based on the noise estimate. In some embodiments of the present invention, the value of the filter parameter may be proportional to the noise estimate.

Figure 3:
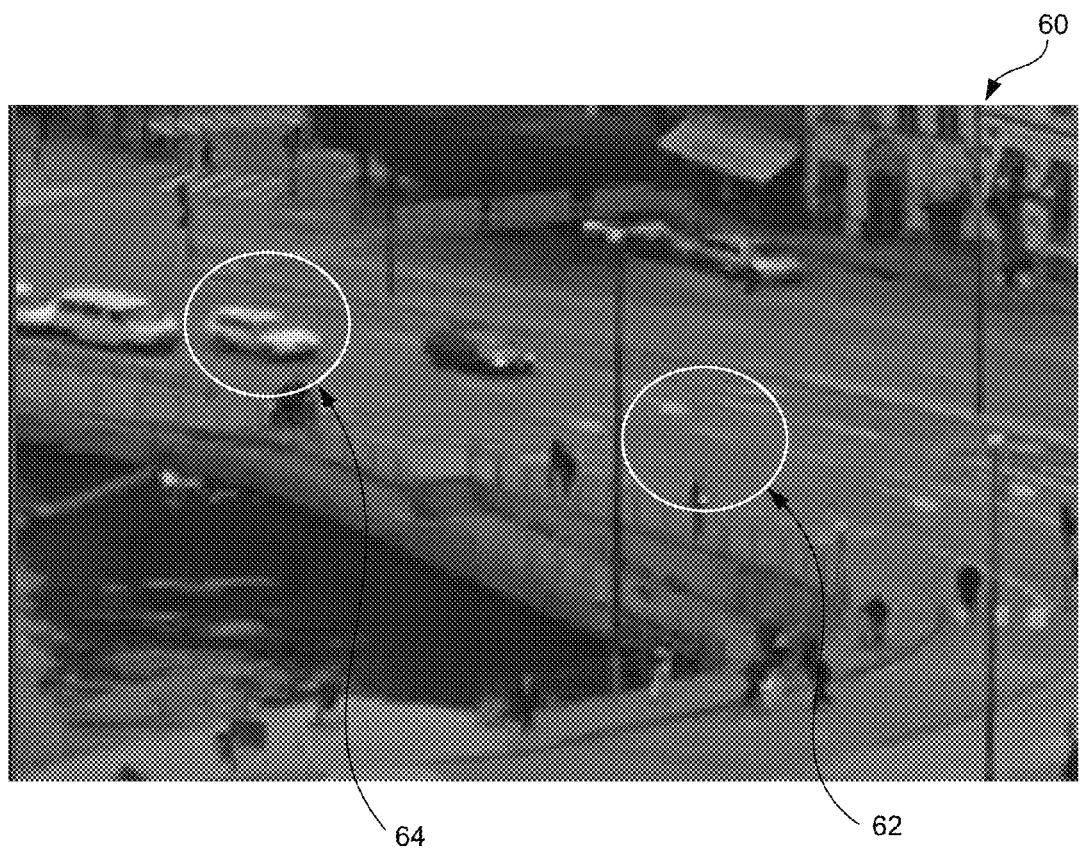
FIG. 3 is an exemplary, original, decoded image frame.
Figure 4:
FIG. 4 is an enhanced image resulting from processing, according to embodiments of the present invention, of the exemplary, original, decoded image frame shown in FIG. 3, wherein the noise estimate used to control the bi-lateral filter parameter value was based only on sensor, thermal and grain noise.
Figure 5:
FIG. 5 is an enhanced image resulting from processing, according to embodiments of the present invention, of the exemplary, original, decoded image frame shown in FIG. 3, wherein the noise estimate used to control the bi-lateral filter parameter value was based on sensor, thermal and grain noise and compression noise.

The effectiveness of some embodiments of the present invention may be illustrated in FIGS. 3-8. FIG. 3 depicts an exemplary, original, decoded image 60 with two regions 62, 64 that exhibit coding artifacts shown inside two white circles superimposed on the image 60. One region 62 is along the road, and another region 64 is around a car. FIG. 4 shows an enhancement 70 of the decoded image 60 shown in FIG. 3. The enhanced image 70 was generated using a bi-lateral filter using only an estimate of the image noise to select the range sigma parameter value of the bi-lateral filter. The coding artifacts are visibly enhanced, for example, the regions 72, 74 that are shown in the two superimposed, white circles. However, the enhanced image 80 shown in FIG. 5, by contrast, was enhanced according to embodiments of the present invention wherein a noise estimate accounting for both the image noise, for example, sensor, thermal, grain and other image noise, and the compression noise in the image frame was used to select the range sigma parameter value of the bi-lateral filter. Using this noise estimate produces an enhanced image 80, but without amplifying the coding artifacts, for example, again examine the regions 82, 84 inside the superimposed, white circles.

Figure 6:
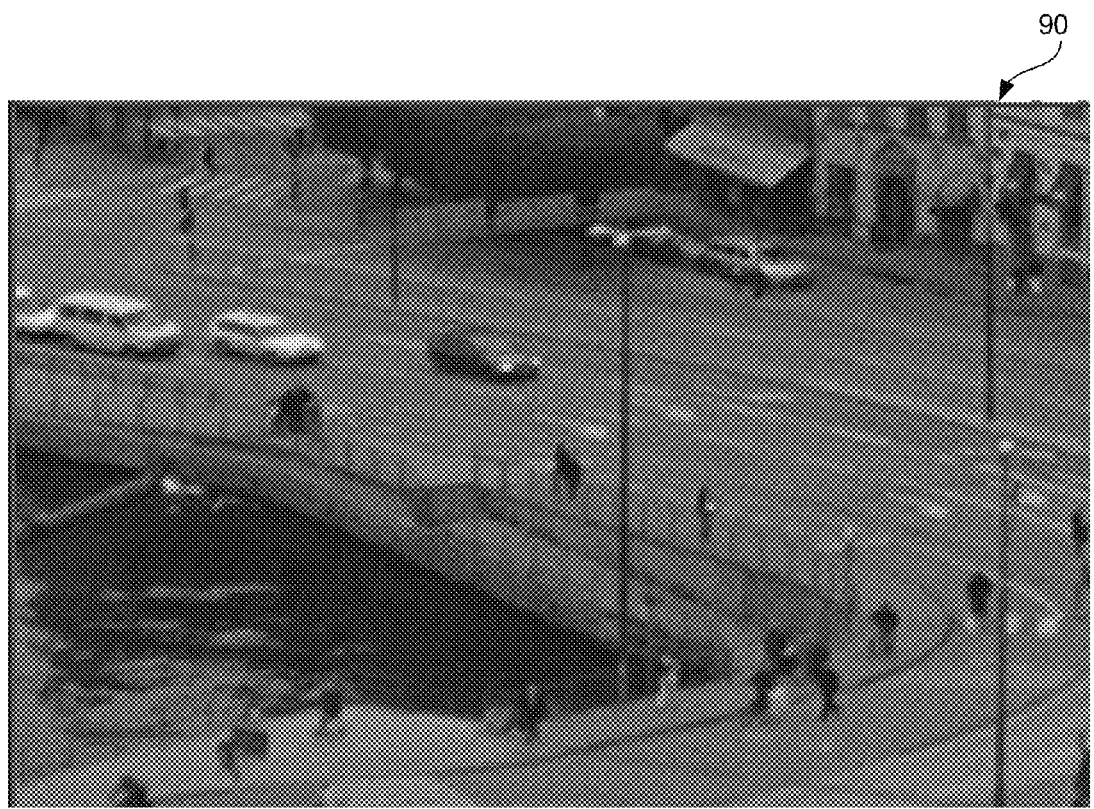
FIG. 6 is an exemplary, original, decoded image frame associated with a lightly compressed image.
Figure 7:
FIG. 7 is an enhanced image resulting from processing, according to embodiments of the present invention, of the exemplary, original decoded image frame shown in FIG. 6, wherein the noise estimate used to control the bi-lateral filter parameter value was based only on compression noise.
Figure 8:
FIG. 8 is an enhanced image resulting from processing, according to embodiments of the present invention, of the exemplary, original decoded image frame shown in FIG. 6, wherein the noise estimate used to control the bi-lateral filter parameter value was based on noise due to sensor, thermal and grain noise and compression noise.

A second exemplary, original, decoded image 90 is depicted in FIG. 6. Here, the image 90 is the result of light compression. Inspection of FIG. 6 shows a significant amount of grain noise, which may become much more visible if enhanced. Shown in FIG. 7 is an enhanced image 100 wherein the noise estimate controlling the parameter selection in the bi-lateral filter considered only the coding noise. As can be seen in FIG. 7, the enhanced image 100 contains amplified grain noise. However, the enhanced image 110 shown in FIG. 8 resulting from image enhancement according to embodiments of the present invention wherein the noise estimate used to select the range sigma parameter for the bi-lateral filter accounted for both the image noise, for example, sensor, thermal, grain and other noise, and the compression noise in an image frame. As can be seen from FIG. 8, the resulting image is enhanced but without amplifying grain noise artifacts.

Embodiments of the present invention described in relation to FIG. 2 comprise codec-noise statistic estimation from the coding parameters. In alternative embodiments described in relation to FIG. 9, the compression noise may be estimated from the decoded image data.

Figure 9:
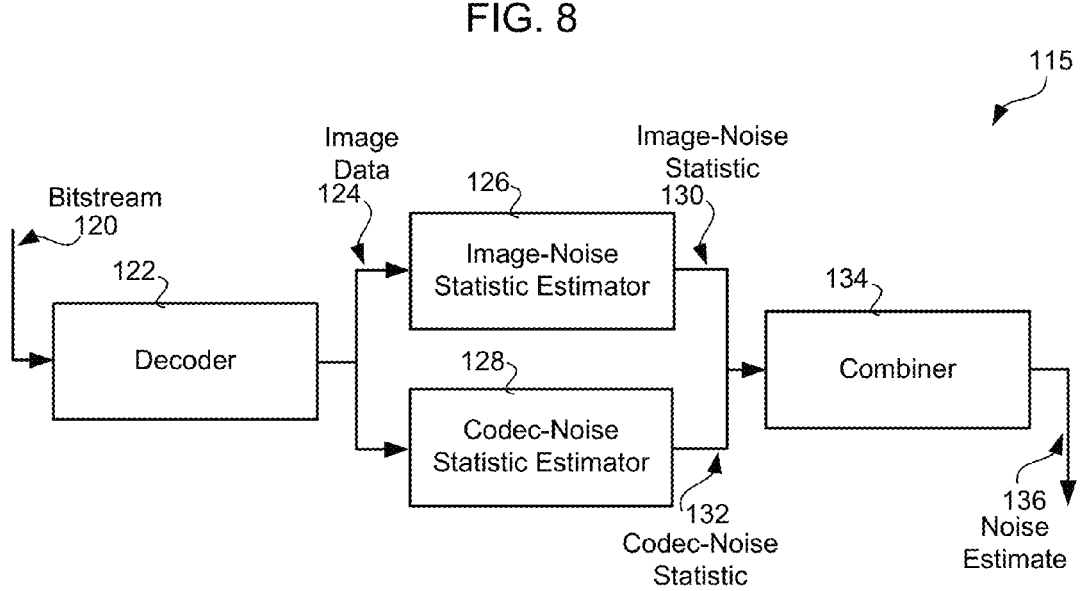
FIG. 9 is a picture depicting exemplary embodiments of the present invention comprising estimation of compression noise directly from image data.

In some embodiments of the present invention, described in relation to FIG. 9, comprising a noise-estimation system 115, an input bitstream 120, associated with a still image or a video sequence, may be decoded by a decoder 122. The image data 124 may be made available, from the decoder 122, to an image-noise statistic estimator 126 and to a codec-noise statistic estimator 128. The image-noise statistic estimator 126 may estimate an image-noise statistic 130 associated with the amount of image noise present in the image data 124, and the codec-noise statistic estimator 128 may estimate a codec-noise statistic 132 associated with the compression noise. The image-noise statistic 130 and the codec-noise statistic 132 may be combined by a combiner 134 to produce a final noise estimate 136 associated with the image data. In one embodiment of the present invention, the maximum value of the image-noise statistic 130 and the codec-noise statistic 132 may be assigned to the noise estimate 136. Alternative fusion methods for combining 134 the image-noise statistic 130 and the codec-noise statistic 132 may be used to produce a final noise estimate 136.

The image-noise statistic estimator 126 may analyze the image data 124 to determine the amount of thermal, sensor, grain and other image noise present in the image data 124. Many existing methods are known in the art for estimating the image noise. In an exemplary embodiment of the present invention, the image-noise statistic estimator 126 may identify one, or more, substantially smooth regions in the image data 124 and may calculate the standard deviation of the pixel values within each region. The maximum standard-deviation value may be associated with the image-noise statistic 130.

Figure 10:
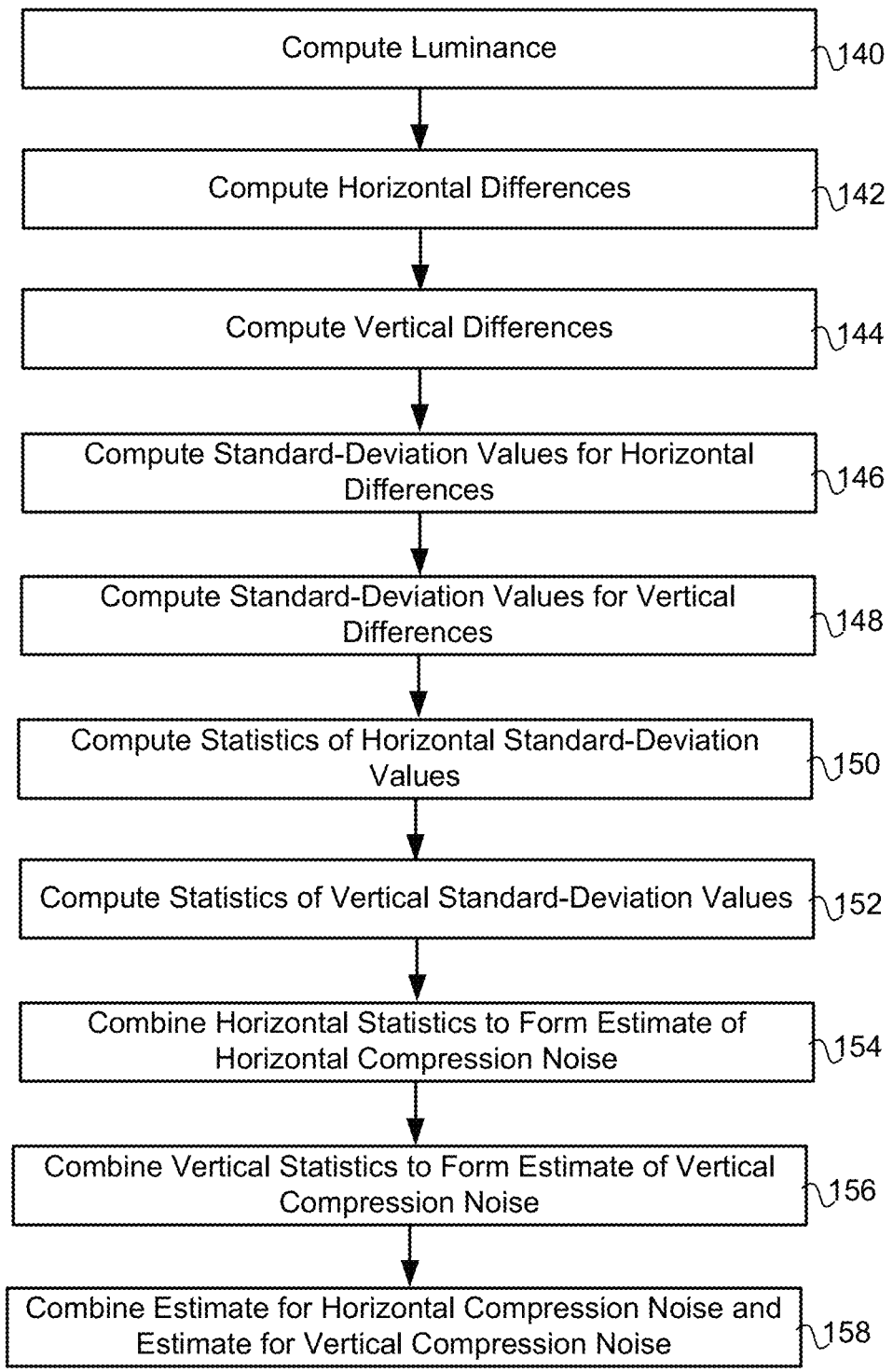
FIG. 10 is a chart showing exemplary embodiments of the present invention comprising estimation of compression noise directly from image data for a still image or a single frame in a video sequence.

In some embodiments of the present invention, the codec-noise statistic estimator 128 may calculate an estimate for the codec noise 132 according to FIG. 10. In these embodiments, a luminance image may be computed 140 from an input RGB (Red Green Blue), or other color space, image. The luminance may be denoted I(r,c), where r and c may denote the row and column indices, respectively. A horizontal difference value at each point may be computed 142, thereby producing a plurality of horizontal difference values, and a vertical difference value at each point may be computed 144, thereby producing a plurality of vertical difference values, according to:

$$D_H(r,c) = I(r,c+1) - I(r,c)$$

and $$D_V(r,c) = I(r+1,c) - I(r,c),$$

respectively, where $D_H(r,c)$ may denote a horizontal difference value at pixel location (r,c) and $D_V(r,c)$ may denote a vertical difference value at pixel location (r,c).

The standard deviation of the horizontal differences at a plurality of horizontal offsets may be computed 146, and the standard deviation of the vertical differences at a plurality of vertical offsets may be computed 148. In some embodiments of the present invention, a standard-deviation value may be calculated for each offset within a coding block, thereby producing a plurality of horizontal standard-deviation values and a plurality of vertical standard-deviation values. The number of offsets may be determined by the structure of the image, or video, codec and any processing or scaling of the decoded data that may be performed prior to estimating the compression noise.

In an exemplary embodiment comprising the use of eight offsets, the standard-deviation values of the horizontal differences may be calculated 146, for an image of width denoted NumCols and height denoted NumRows, according to:

$$Mean_H[i] = \sum_{r=0}^{NumRows} \sum_{c=0}^{NumCols/8} \frac{D_H(r, 8 \cdot c + i)}{NumRows \cdot (NumCols/8)},$$

$$i = 0 \ldots 7$$

$$Mean2_H[i] = \sum_{r=0}^{NumRows} \sum_{c=0}^{NumCols/8} \frac{D_H(r, 8 \cdot c + i)^2}{NumRows \cdot (NumCols/8)},$$

$$i = 0 \ldots 7$$

$$STD_H[i] = sqrt(Mean2_H[i] - Mean_H[i]^2),$$

$$i = 0 \ldots 7.$$

Figure 11:
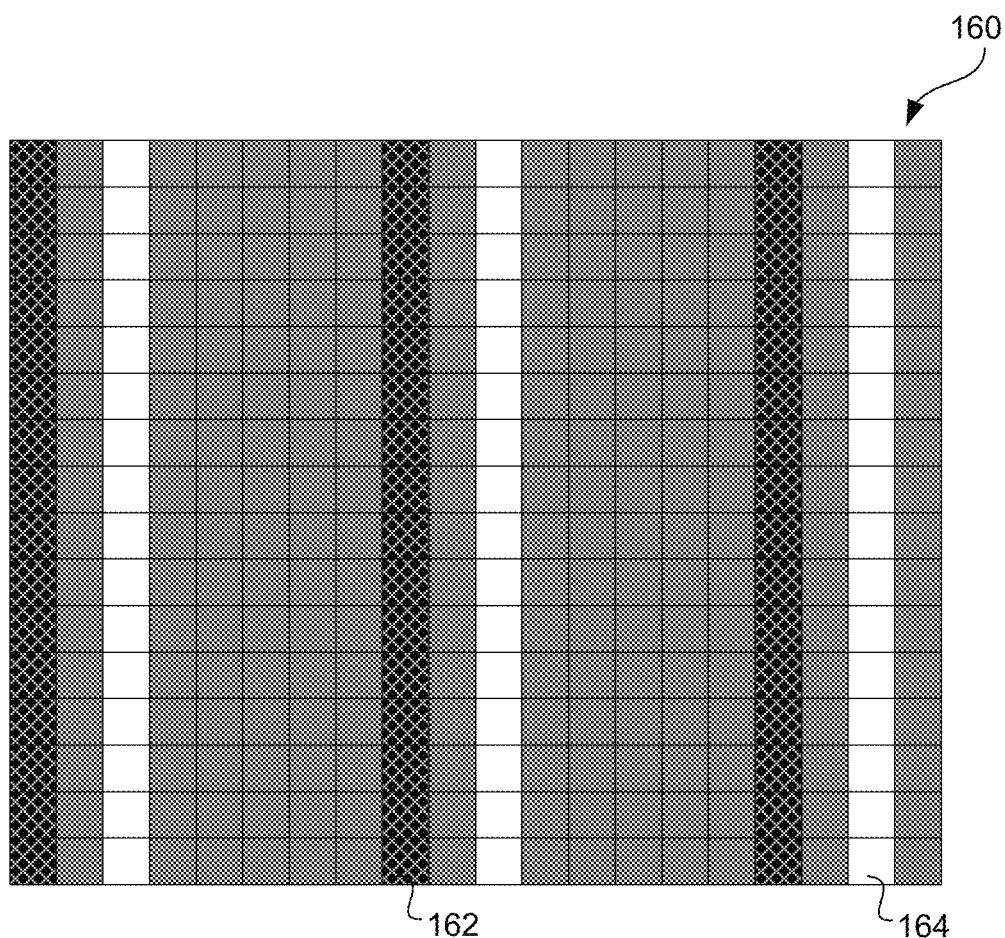
FIG. 11 is a picture illustrating exemplary pixel locations for determination of horizontal differences according to embodiments of the present invention.

FIG. 11 depicts an exemplary portion of an image 160 with pixel locations shown as squares. The pixel locations shown in cross hatch, for example 162, may be the locations used for computing the horizontal standard deviation associated with an offset of zero, $STD_H[0]$, and the pixel locations shown in white, for example 164, may be the locations used for computing the horizontal standard deviation associated with an offset of two, $STD_H[2]$.

The standard-deviation values of the vertical differences may be similarly calculated 148 according to:

$$Mean_V[i] = \sum_{r=0}^{NumRows/8} \sum_{c=0}^{NumCols} \frac{D_V(8 \cdot r + i, c)}{(NumRows/8) \cdot NumCols},$$

$$i = 0 \ldots 7$$

$$Mean2_V[i] = \sum_{r=0}^{NumRows/8} \sum_{c=0}^{NumCols} \frac{D_V(8 \cdot r + i, c)^2}{(NumRows/8) \cdot NumCols},$$

$$i = 0 \ldots 7$$

$$STD_V[i] = sqrt(Mean2_V[i] - Mean_V[i]^2),$$

$$i = 0 \ldots 7.$$

Referring again to FIG. 10, statistics may be computed 150 for the horizontal standard-deviation values, and statistics may be computed 152 for the vertical standard-deviation values. The statistics computed 150 for the horizontal standard-deviation values may be referred to as horizontal statistics and the statistics computed 152 for the vertical standard-deviation values may be referred to as vertical statistics. In some embodiments of the present invention, the average of the horizontal standard-deviation values and the maximum horizontal standard-deviation value may be computed 150, and the average of the vertical standard-deviation values and the maximum vertical standard-deviation value may be computed 152. These values may be computed according to:

$$STD_{H\_MEAN} = \sum_{i=0}^{7} \frac{STD_H[i]}{8}$$

$$STD_{H\_MAX} = \max(STD_H[i]), i = 0 \ldots 7$$

$$STD_{V\_MEAN} = \sum_{i=0}^{7} \frac{STD_V[i]}{8}$$

$$STD_{V\_MAX} = \max(STD_V[i]), i = 0 \ldots 7,$$

respectively. In alternative embodiments, other statistical values may be calculated, for example, the median, the skew, the kurtosis and other statistical measures.

The computed statistics associated with the horizontal standard-deviation values may be combined 154 to form an estimate of the horizontal compression noise. The computed statistics associated with the vertical standard-deviation values may be combined 156 to form an estimate of the vertical compression noise. In an exemplary embodiment of the present invention, an estimate of the horizontal compression noise may be calculated according to a weighted average given by:

$$Noise_{Compression\_H} = 4.64 \cdot STD_{H\_MAX} - 4.26 \cdot STD_{H\_MEAN} + 0.58,$$

and an estimate of the vertical compression noise may be calculated according to a weighted average given by:

$$Noise_{Compression\_V} = 4.64 \cdot STD_{V\_MAX} - 4.26 \cdot STD_{V\_MEAN} + 0.58,$$

where the values 4.64, 4.26 and 0.58 are exemplary weighting parameters. In alternative embodiments, other weighting values may be used.

The estimate for the horizontal compression noise and the estimate for the vertical compression noise may be combined 158 to form a single compression noise estimate. Any data fusion method known in the art may be used to combine the estimate for the horizontal compression noise and the estimate for the vertical compression noise. In some embodiments of the present invention, the compression-noise estimate may be determined according to:

$$\text{Noise}_{Compression} = \max(\text{Noise}_{Compression\_H}, \text{Noise}_{Compression\_V}).$$

Figure 12:
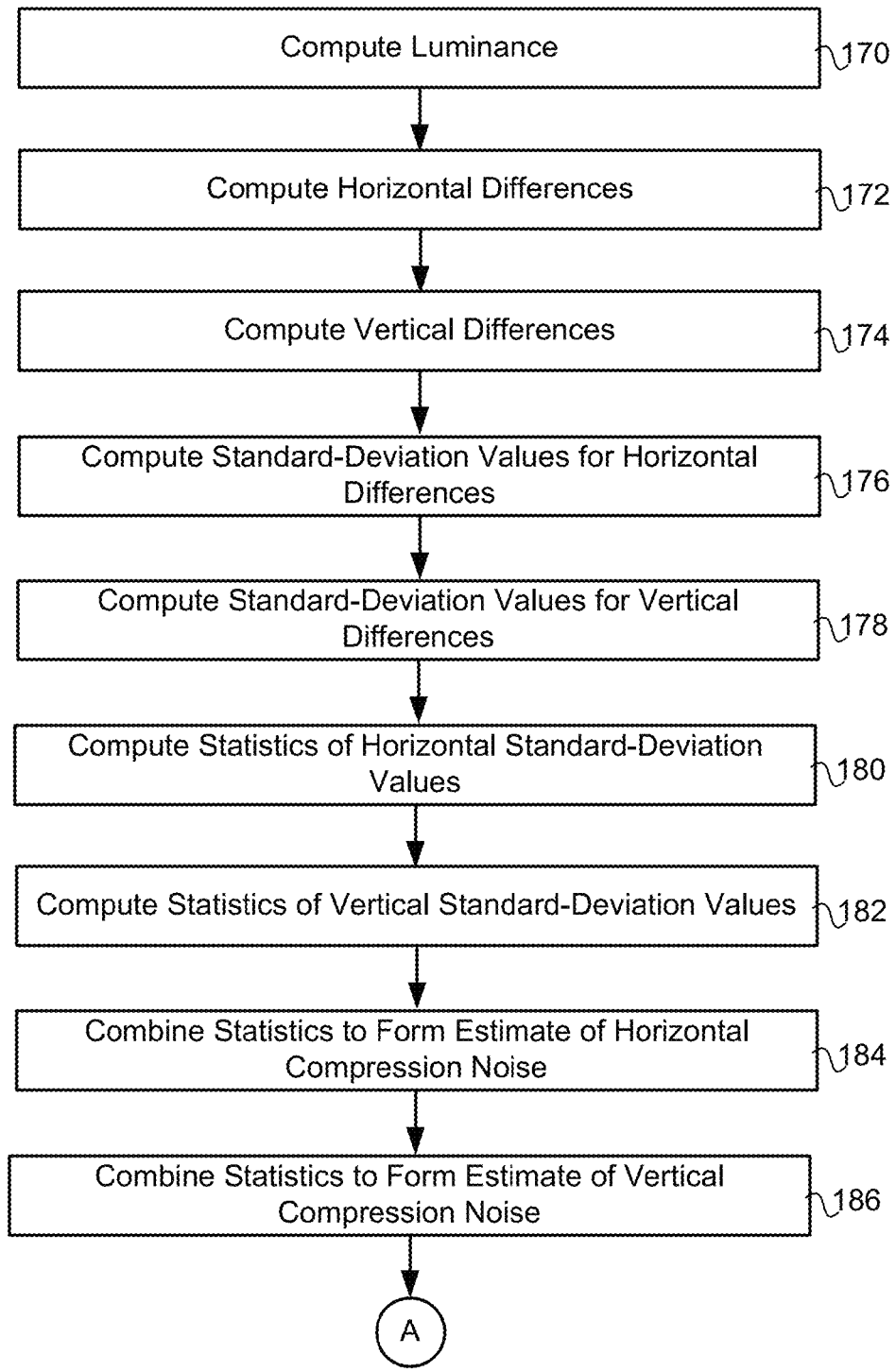
FIG. 12 is a chart showing exemplary embodiments of the present invention comprising estimation of compression noise directly from image data for a frame in a video sequence.
Figure 12:
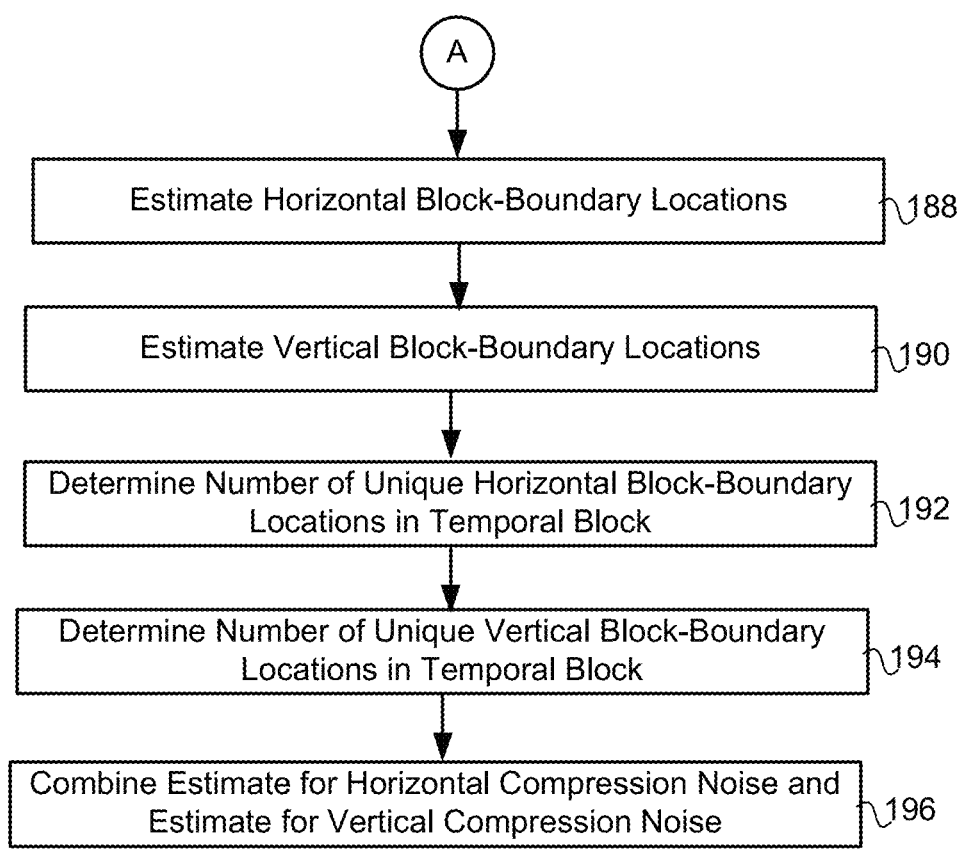

In alternative embodiments of the present invention, the codec-noise statistic estimator 128 may calculate an estimate for the codec noise 132 according to FIG. 12. In these embodiments, the input image may be a frame in a video sequence, and past frames may be considered in determining the codec-noise estimate. In these embodiments, a luminance image may be computed 170 from an input RGB, or other color space, image, and the luminance may be denoted I(r,c), where r and c may denote the row and column indices, respectively. A horizontal difference value at each point may be computed 172, thereby producing a plurality of horizontal difference values, and a vertical difference value at each point may be computed 174, thereby producing a plurality of vertical difference values, according to:

$$D_H(r,c) = I(r,c+1) - I(r,c)$$

and $$D_V(r,c) = I(r+1,c) - I(r,c),$$

respectively, where $D_H(r,c)$ may denote a horizontal difference value at pixel location (r,c) and $D_V(r,c)$ may denote a vertical difference value at pixel location (r,c).

The standard deviation of the horizontal differences at a plurality of horizontal offsets may be computed 176, and the standard deviation of the vertical differences at a plurality of vertical offsets may be computed 178. In some embodiments of the present invention, a standard-deviation value may be calculated for each offset within a coding block, thereby producing a plurality of horizontal standard-deviation values and a plurality of vertical standard-deviation values. The number of offsets may be determined by the structure of the video codec and any processing or scaling of the decoded data that may be performed prior to estimating the compression noise.

In an exemplary embodiment comprising the use of eight offsets, the standard-deviation values of the horizontal differences may be calculated 176 according to:

$$Mean_H[i] = \sum_{r=0}^{NumRows} \sum_{c=0}^{NumCols/8} \frac{D_H(r, 8 \cdot c + i)}{NumRows \cdot (NumCols/8)},$$

$$i = 0 \ldots 7$$

$$Mean2_H[i] = \sum_{r=0}^{NumRows} \sum_{c=0}^{NumCols/8} \frac{D_H(r, 8 \cdot c + i)^2}{NumRows \cdot (NumCols/8)},$$

$$i = 0 \ldots 7$$

$$STD_H[i] = sqrt(Mean2_H[i] - Mean_H[i]^2),$$

$$i = 0 \ldots 7.$$

The standard-deviation values of the vertical differences may be similarly calculated 178 according to:

$$Mean_V[i] = \sum_{r=0}^{NumRows/8} \sum_{c=0}^{NumCols} \frac{D_V(8 \cdot r + i, c)}{(NumRows/8) \cdot NumCols},$$

$$i = 0 \ldots 7$$

$$Mean2_V[i] = \sum_{r=0}^{NumRows/8} \sum_{c=0}^{NumCols} \frac{D_V(8 \cdot r + i, c)^2}{(NumRows/8) \cdot NumCols},$$

$$i = 0 \ldots 7$$

$$STD_V[i] = sqrt(Mean2_V[i] - Mean_V[i]^2),$$

$$i = 0 \ldots 7.$$

Statistics may be computed 180 for the horizontal standard-deviation values, and statistics may be computed 182 for the vertical standard-deviation values. In some embodiments of the present invention, the average of the horizontal standard-deviation values and the maximum horizontal standard-deviation value may be computed 180, and the average of the vertical standard-deviation values and the maximum vertical standard-deviation value may be computed 182. These values may be computed according to:

$$STD_{H\_MEAN} = \sum_{i=0}^{7} \frac{STD_H[i]}{8}$$

$$STD_{H\_MAX} = \max(STD_H[i]), i = 0 \ldots 7$$

$$STD_{V\_MEAN} = \sum_{i=0}^{7} \frac{STD_V[i]}{8}$$

$$STD_{V\_MAX} = \max(STD_V[i]), i = 0 \ldots 7,$$

respectively. In alternative embodiments, other statistical values may be calculated, for example, the median, the skew, the kurtosis and other statistical measures.

The computed statistics associated with the horizontal standard-deviation values may be combined 184 to form an estimate of the horizontal compression noise. The computed statistics associated with the vertical standard-deviation values may be combined 186 to form an estimate of the vertical compression noise. In an exemplary embodiment of the present invention, an estimate of the horizontal compression noise may be calculated according to a weighted average given by:

$$\text{Noise}_{Compression\_H} = 4.64 \cdot STD_{H\_MAX} - 4.26 \cdot STD_{H\_MEAN} + 0.58,$$

and an estimate of the vertical compression noise may be calculated according to a weighted average given by:

$$\text{Noise}_{Compression\_V} = 4.64 \cdot STD_{V\_MAX} - 4.26 \cdot STD_{V\_MEAN} + 0.58,$$

where the values 4.64, 4.26 and 0.58 are exemplary weighting parameters. In alternative embodiments, other weighting values may be used.

The location of block boundaries in the current image frame may be estimated 188, 190 using the statistics previously computed. In an exemplary embodiment, a horizontal-block boundary location may be estimated 188 using the maximum horizontal standard-deviation value according to:

$$Block_H[\text{frame\_num}] = i, \text{where } STD_{H\_MAX} == STD_H[i],$$

where frame_num may denote a time index associated with the current frame. A vertical block-boundary location may be estimated 190 by the maximum vertical standard-deviation value according to:

$$Block_V[\text{frame\_num}] = i, \text{where } STD_{V\_MAX} == STD_V[i],$$

where frame_num may denote a time index associated with the current frame.

The number of unique horizontal block-boundary locations and the number of unique vertical block-boundary locations in a temporal block may be determined 192, 194 by counting the number of unique values for $Block_H[i]$ and $Block_V[i]$, respectively, where i is an index with values from frame_num to frame_num−N and N is a constant. If the number of unique values for the horizontal direction is above a threshold, then the estimate for the horizontal compression noise may be set equal to zero, and if the number of unique values for the vertical direction is above a threshold, then the estimate for the vertical compression noise may be set equal to zero.

The estimate for the horizontal compression noise and the estimate for the vertical compression noise may be combined 196 to form a single compression noise estimate. Any data fusion method known in the art may be used to combine the estimate for the horizontal compression noise and the estimate for the vertical compression noise. In some embodiments of the present invention, the compression-noise estimate may be determined according to:

$$Noise_{Compression} = \max(Noise_{Compression\_H}, Noise_{Compression\_V}).$$

Figure 13:
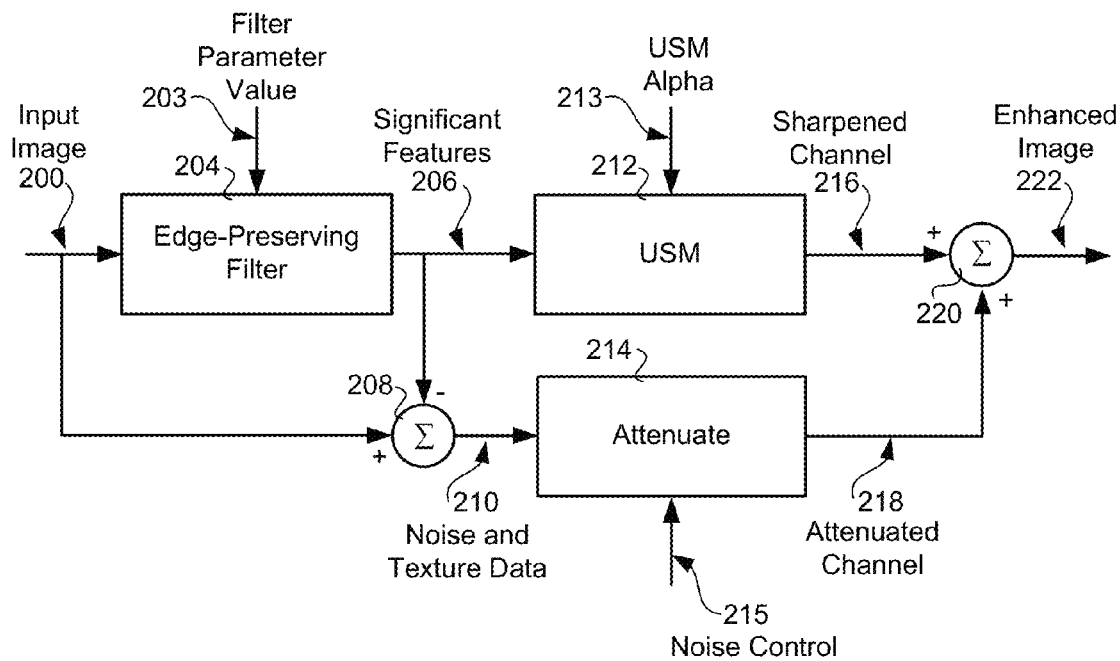
FIG. 13 is a picture depicting exemplary embodiments of the present invention comprising un-sharp masking.

In some embodiments of the present invention, the parameters of an edge-preserving filter may be adjusted based on a sharpening value used in a sharpening filter. In some exemplary embodiments, the edge-preserving filter may comprise a bi-lateral filter. In exemplary embodiments of the present invention shown in FIG. 13 and FIG. 14, an edge-preserving filter 204 may be used to separate an input image 200 into two channels: a first channel 206 which may comprise image content to be sharpened by un-sharp masking (USM) 212; and a second channel 210 which may comprise image content to attenuate. The level of sharpening associated with the un-sharp masking 212 may be controlled by the value of the USM alpha 213 set for the USM filter 212. In these embodiments, a filter parameter value 203 of the edge-preserving filter 204 may control the assignment of input-image content to the first channel 206 and the second channel 210. In some embodiments of the present invention wherein the edge-preserving filter comprises a bi-lateral filter, the filter parameter value may be the range sigma parameter value associated with the bi-lateral filter.

In some embodiments, in order to maximize the amount of sharpening, the filter parameter 203 may be set based on the noise statistics associated with the input image 200, and additionally, in order to mitigate noise amplification due to sharpening, the filter parameter 203 may be set based on the sharpening value 213 used in the sharpening filter 212.

An input image 200 and a filter parameter value 203 associated with the input image may be made available to an edge-preserving filter 204. The edge-preserving filter 204 may be used to divide the input image 200 into two channels 206, 210. The first channel 206 may correspond to significant features in the input image 200, and the second channel 210, formed by removing 208 the first channel 206 from the input image 200, may contain the residual difference between the first channel 206 and the input image 200. The residual difference 210 may comprise noise and texture data. The first channel 206 may be sharpened using un-sharp masking 212, and the second channel 210 may be attenuated 214 in accordance with noise control 215. The sharpened channel 216 and the attenuated channel 218 may be combined 220 to form an enhanced image 222. The filter parameter value 203 of the edge-preserving filter 204 may control the assignment of input-image content to the first channel 206 and the second channel 210. In some embodiments of the present invention (not shown), the enhanced image 222 may be up-sampled to a resolution greater than that of the input image 200.

Figure 14:
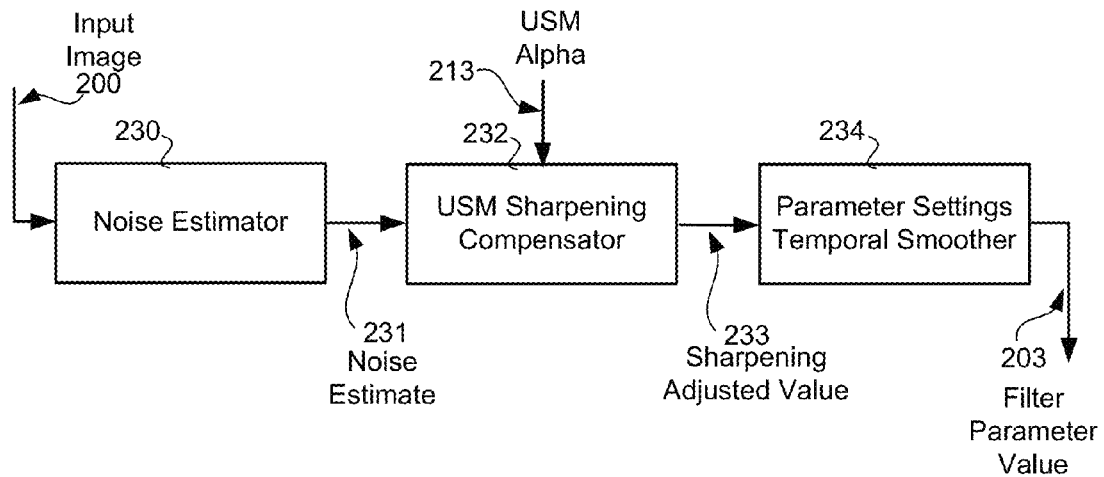
FIG. 14 is a picture depicting exemplary embodiments of the present invention comprising edge-preserving filter parameter value determination based on the level of sharpening associated with the un-sharp masking.

Referring to FIG. 14, the input image 200 may be received by a noise estimator 230 which may generate a noise estimate 231 based on an estimate of the image noise and the codec noise present in the input image 200. In some embodiments of the present invention, the noise estimate 231 may be determined according to the noise-estimation embodiments of the present invention described herein. The noise estimate 231 may be adjusted by a USM sharpening compensator 232 to account for the sharpening value, and the resulting sharpening-adjusted value 233 may be temporally filtered 234 to reduce noise in the control process. The output of the temporal filter 234 may be the filter parameter value 203 provided to the edge-preserving filter 204.

Figure 15:
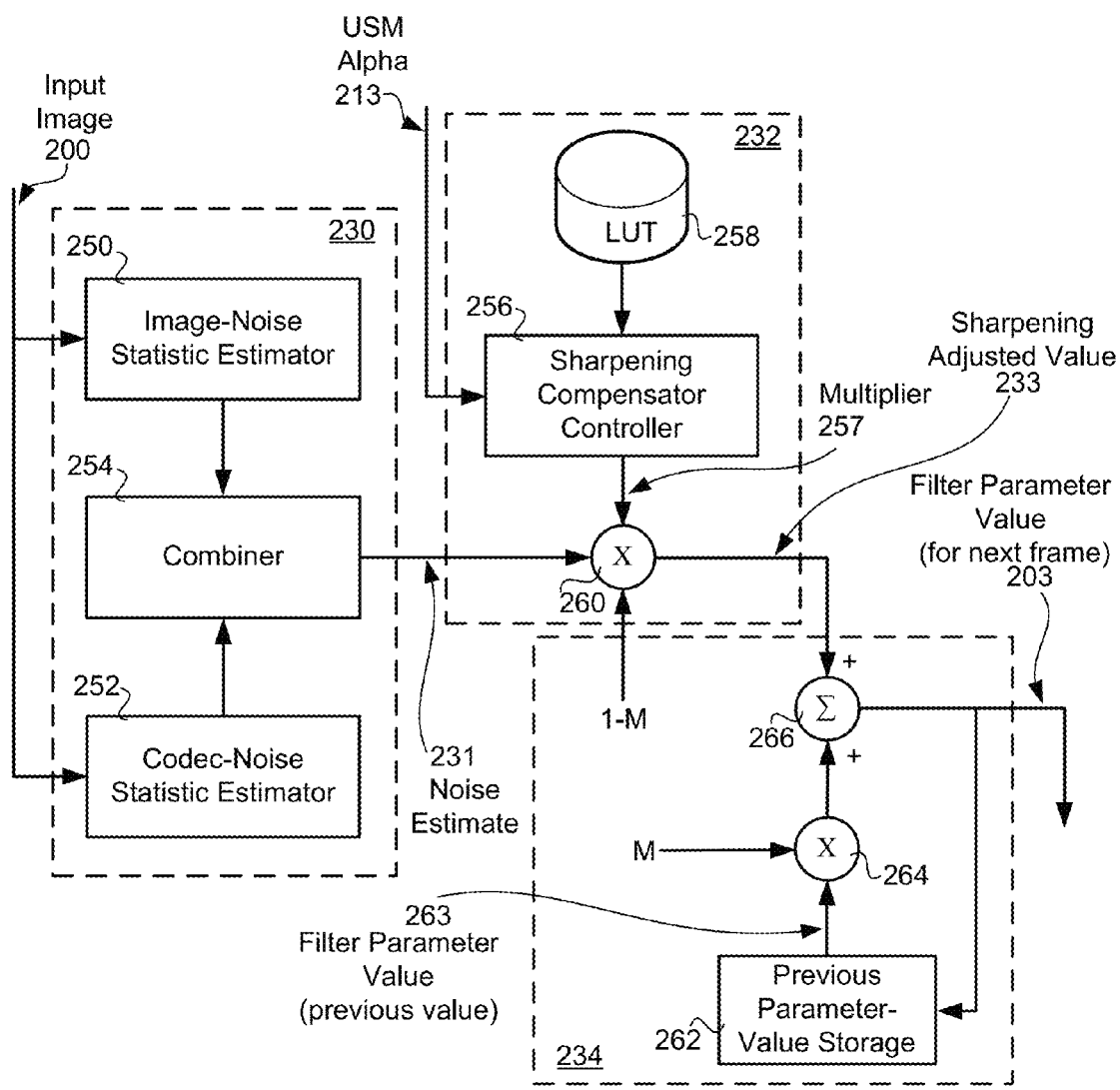
FIG. 15 is a picture depicting exemplary embodiments of the present invention comprising edge-preserving filter parameter value determination based on the level of sharpening associated with the un-sharp masking and based on temporal smoothing.

In some embodiments of the present invention described in relation to FIG. 14 and FIG. 15, the noise estimator 230 may comprise an image-noise statistic estimator 250 and a codec-noise statistic estimator 252 for estimating image noise and codec noise associated with an input image 200, respectively. The noise estimator 230 may comprise a combiner 254 for combining the image noise estimated by the image-noise statistic estimator 250 and the codec noise codec-noise statistic estimator 252. The noise estimate 231 may be provided to the USM sharpening compensator 232. In some embodiments, the noise estimate 231 may be converted to a standard-deviation value in the noise estimator 230. In alternative embodiments, the noise estimate may be converted to a standard-deviation value in the USM sharpening compensator 232.

Figure 16:
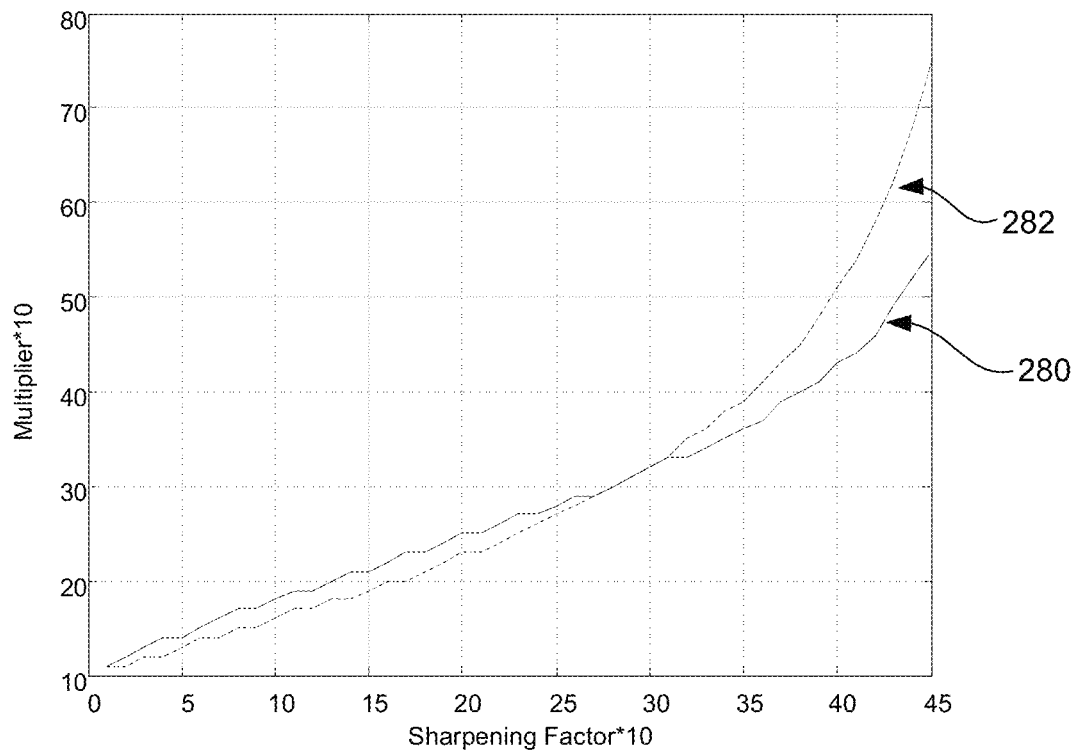
FIG. 16 is a plot showing two exemplary look-up tables for associating a sharpening factor with a multiplier.

The USM sharpening compensator 232 may adjust the noise estimate 231 by a value associated with the level of sharpening 213. In some embodiments of the present invention, a sharpening compensator controller 256 may use the USM alpha value 213 as an index into a look-up table 258 to determine a multiplier 257 which may be used to multiplicatively adjust 260 the standard-deviation-value noise estimate 231. FIG. 16 depicts two plots 280, 282 each associated with an exemplary look-up table derived to maintain a constant noise level with increasing sharpening factor.

In addition to adjusting the noise estimate 231 by the value 257 associated with the level of sharpening 213, the noise estimate 231 may be multiplicatively 260 adjusted by a value associated with control parameter, which may be denoted M, that controls how quickly the estimated parameter values may change as a function of time. In some embodiments the multiplicative adjustment 260 may be 1−M. In some embodiments of the present invention, a smaller value for M may correspond to a faster change, while a larger value for M may correspond to a slower change. In some embodiments of the present invention, M may be set to 0.5. A filter parameter value 263 associated with a previous frame may be retrieved from storage 262 and multiplied 264 by the control parameter M. The results of the two multiplications 260, 264 may be added 266 to form the edge-preserving filter parameter 203 for the next frame.

Figure 17:
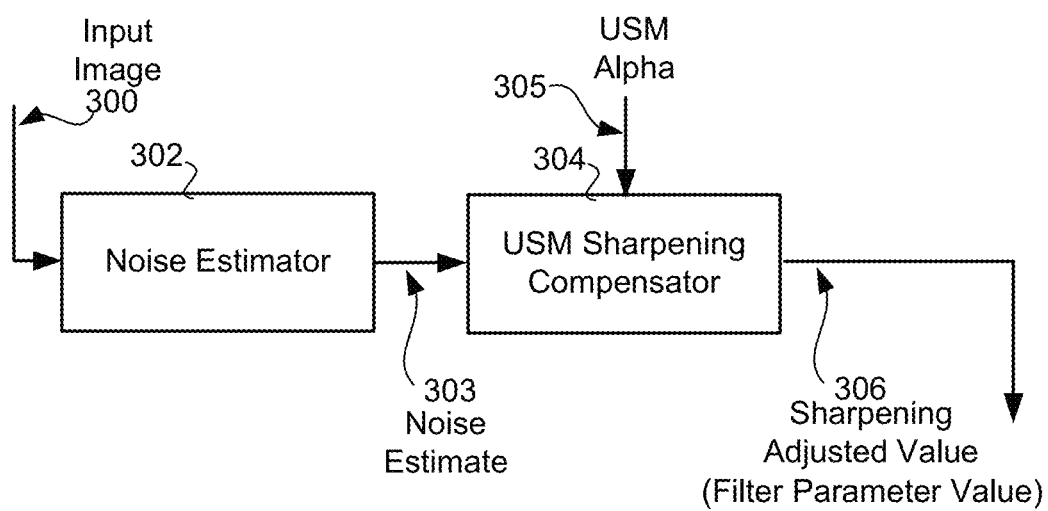
FIG. 17 is a picture depicting exemplary embodiments of the present invention comprising edge-preserving filter parameter value determination based on the level of sharpening associated with the un-sharp masking.

In alternative embodiments described in relation to FIG. 17, an edge-preserving filter parameter may be determined for filtering of a still image, or a video frame. An input image 300 may be received by a noise estimator 302 which may generate a noise estimate 303 based on an estimate of the image noise and the codec noise present in the input image 300. The noise estimate 303 may be determined according to the noise-estimation embodiments of the present invention described herein. The noise estimate 303 may be adjusted by a USM sharpening compensator 304 to account for the sharpening value 305, and the resulting sharpening-adjusted value 306 may be the filter parameter value 306 provided to the edge-preserving filter 204.

Figure 18:
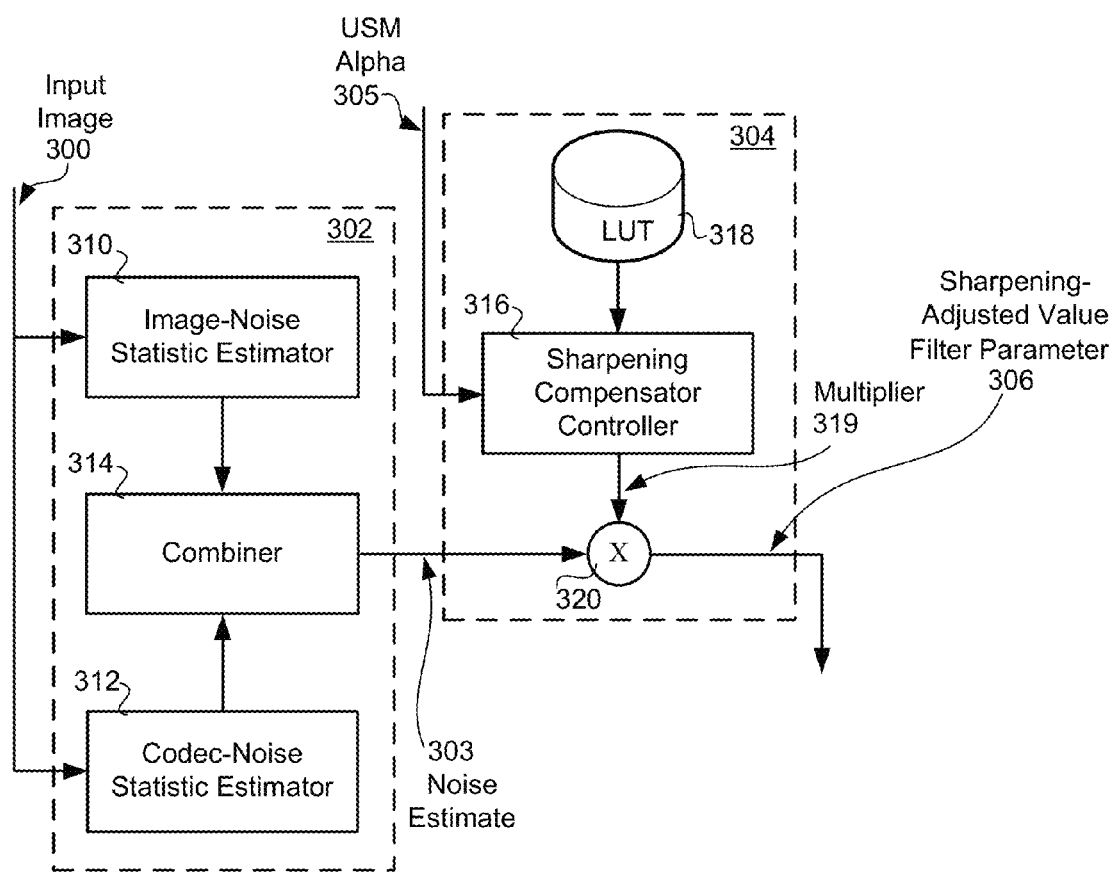
FIG. 18 is a picture depicting an exemplary embodiment of the present invention comprising edge-preserving filter parameter value determination based on the level of sharpening associated with the un-sharp masking.

In some embodiments of the present invention described in relation to FIG. 17 and FIG. 18, the noise estimator 302 may comprise an image-noise statistic estimator 310 and a codec-noise statistic estimator 312 for estimating image noise and codec noise associated with an input image 300, respectively. The noise estimator 302 may comprise a combiner 314 for combining the image noise estimated by the image-noise statistic estimator 310 and the codec noise codec-noise statistic estimator 312. The noise estimate 303 may be provided to the USM sharpening compensator 304. In some embodiments, the noise estimate 303 may be converted to a standard-deviation value in the noise estimator 302. In alternative embodiments, the noise estimate 303 may be converted to a standard-deviation value in the USM sharpening compensator 304.

The USM sharpening compensator 304 may adjust the noise estimate 303 by a value associated with the level of sharpening 305. In some embodiments of the present invention, a sharpening compensator controller 316 may use the USM alpha value 305 as an index into a look-up table 318 to determine a multiplier 319 which may be used to multiplicatively adjust 320 the standard-deviation-value noise estimate 303 to produce a sharpening-adjusted edge-preserving filter parameter value 306. FIG. 16 depicts two plots 280, 282 each associated with an exemplary look-up table derived to maintain a constant noise level with increasing sharpening factor.

Figure 19:
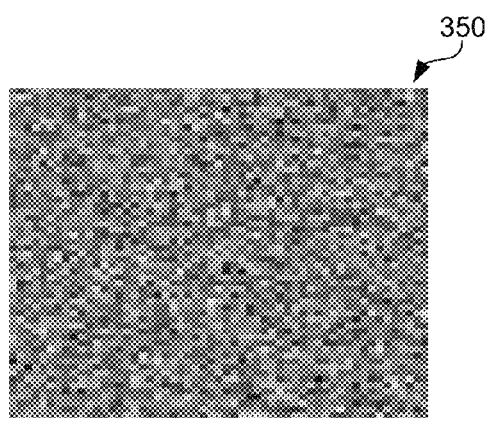
FIG. 19 is an exemplary, original noise image.
Figure 20:
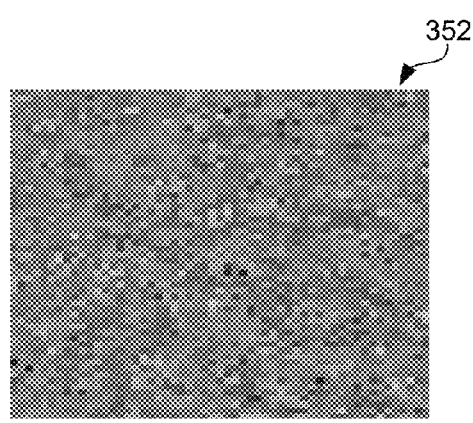
FIG. 20 shows a result of bi-lateral filtering, using a sigma range parameter value equal to the standard deviation of the noise, of the original noise image shown in FIG. 19.
Figure 21:
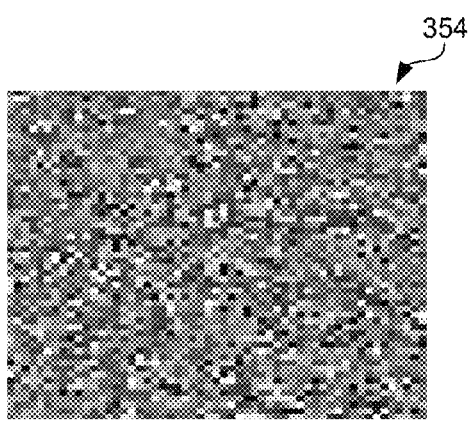
FIG. 21 shows a result of bi-lateral filtering, according to embodiments of the present invention, of the original noise image shown in FIG. 19, where the bi-lateral filter parameter value was set based on the noise in the original noise image.
Figure 22:
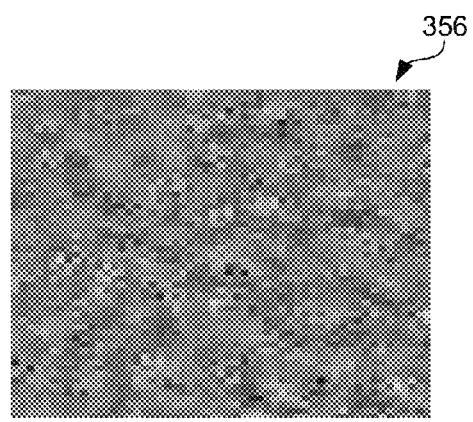
FIG. 22 shows a result of bi-lateral filtering, according to embodiments of the present invention, of the original noise image shown in FIG. 19, where the bi-lateral filter parameter value was set based on the noise in the original noise image and the level of sharpening.

The effectiveness of embodiments of the present invention may be illustrated in FIGS. 19-25. FIG. 19 depicts an exemplary, original, synthetic noise target 350. FIG. 20 shows the result 352 of bi-lateral filtering, using a sigma range parameter value equal to the standard deviation of the noise, of the original image 350 shown in FIG. 19. An enhanced image 354 is shown in FIG. 21. This enhanced image 354 exhibits significant amplification of the image noise. FIG. 22 depicts an enhanced image 356 enhanced according to embodiments of the present invention in which the bi-lateral filter sigma range parameter is set according to the noise statistics of the image in addition to accounting for the sharpening strength of the sharpening filter. The noise in FIG. 22 is similar to the noise in FIG. 20, but the degree of enhancement is different.

Figure 23:
FIG. 23 shows an exemplary, original image.
Figure 24:
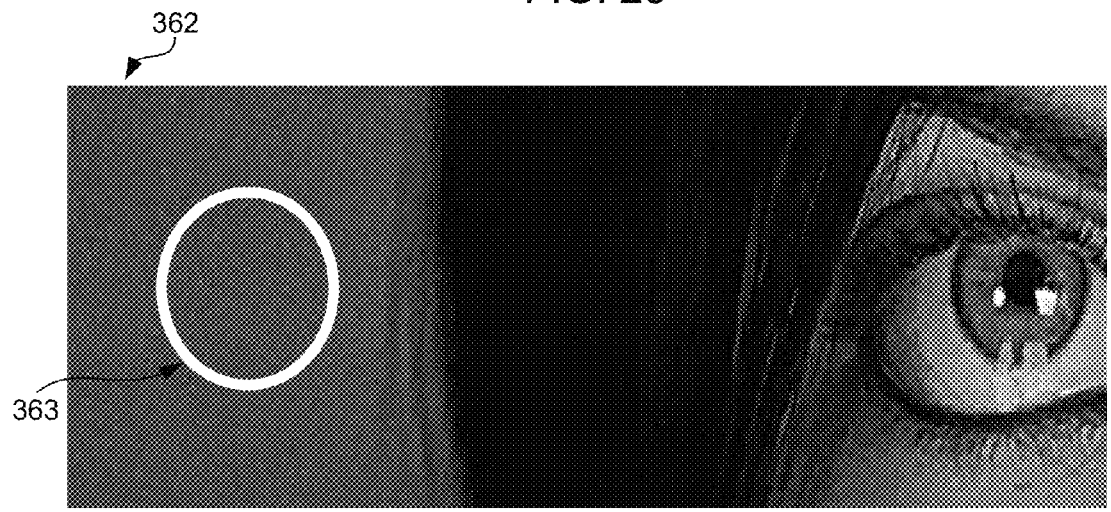
FIG. 24 shows a result of bi-lateral filtering, according to embodiments of the present invention, of the original image shown in FIG. 23, where the bi-lateral filter parameter value was set based on noise estimated from the original image.
Figure 25:
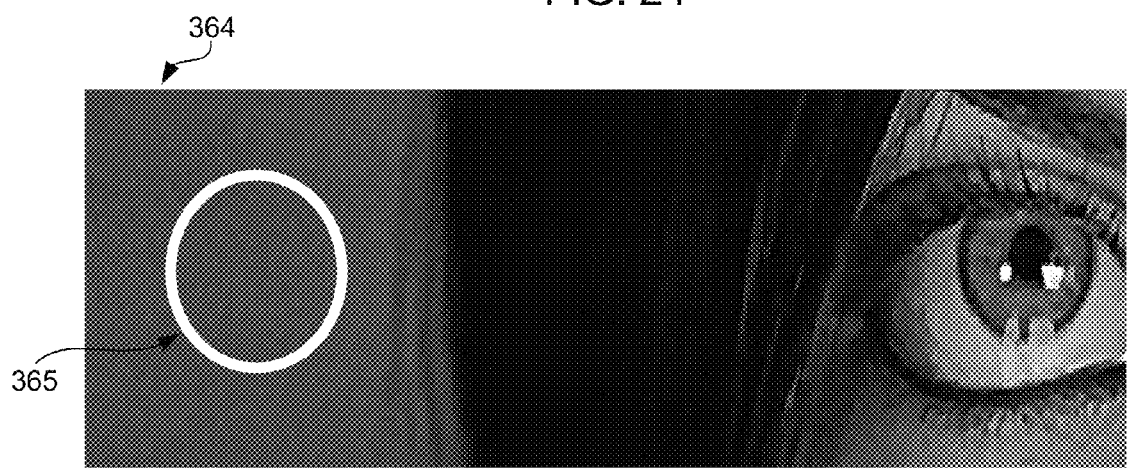
FIG. 25 shows a result of bi-lateral filtering, according to embodiments of the present invention, of the original image shown in FIG. 23, where the bi-lateral filter parameter value was set based on noise estimated from the original image and the level of sharpening.

A second exemplary, original image 360 is depicted in FIG. 23. A superimposed, white circle 361 is shown on the image 360 in a region wherein the noise in the image 360 is visible. FIG. 24 depicts an image 362 which results from bi-lateral filtering according to embodiments of the present invention with a range sigma parameter that has been set accounting for the noise, but not the sharpening process. Inspection of the region inside the overlaid white circle 363 shows that the noise is amplified relative to the input image 360. FIG. 25 depicts an image 364 which results from bi-lateral filtering according to embodiments of the present invention with a range sigma parameter that has been set accounting for both noise and the sharpening process. Inspection of the region inside the overlaid white circle 365 shows that the noise is not amplified relative to the original image 360, but the desired increase in sharpening of image content is visible.

When an image or video sequence has a large amount of texture, many systems and methods for estimating non-codec noise may fail due to a strong correlation between texture and an additive-noise estimate computed based on standard deviations of image patches, and consequently, over-smoothing may occur.

Figure 26:
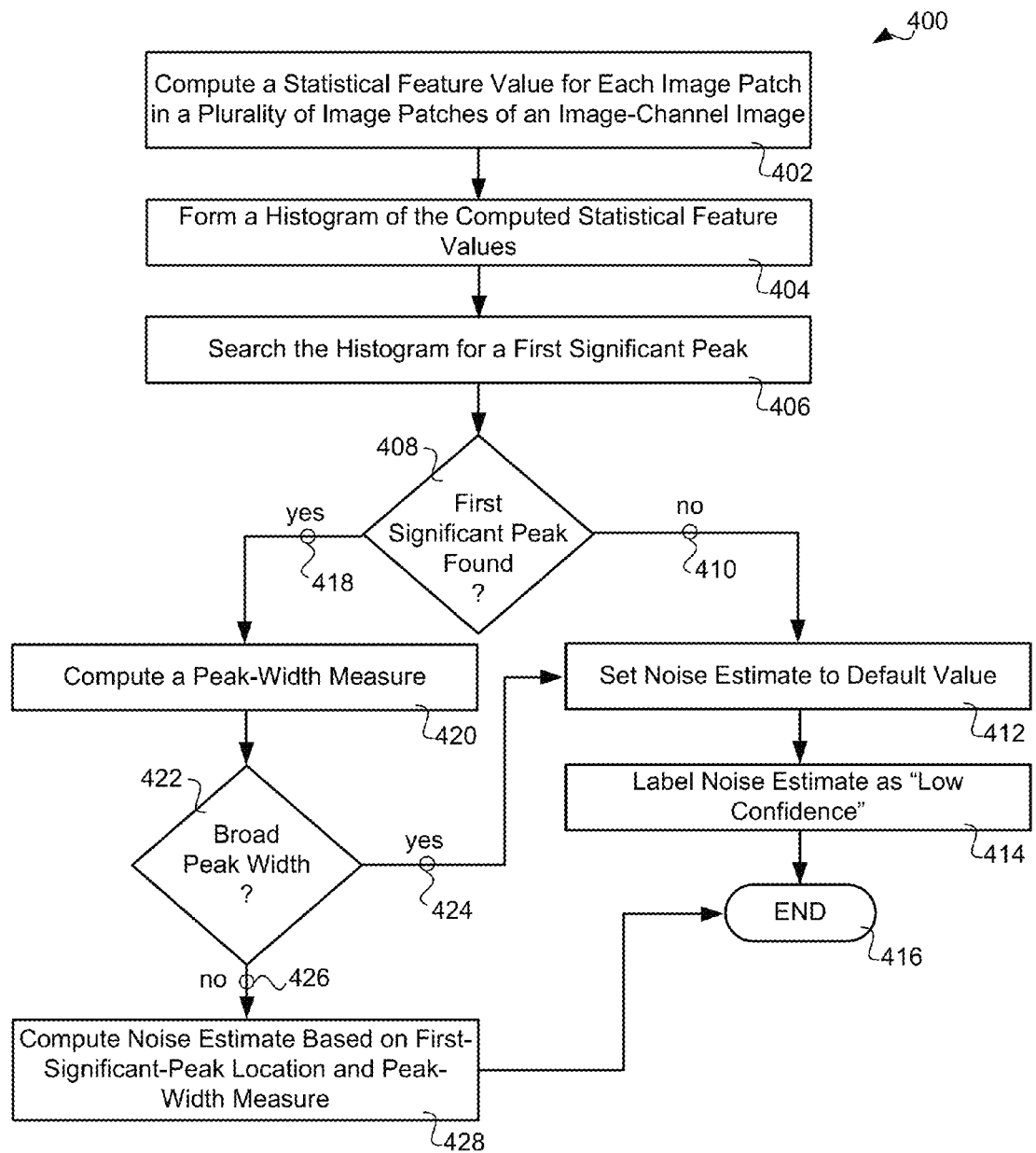
FIG. 26 is a chart showing exemplary embodiments of the present invention comprising methods for estimating additive noise based on a first significant peak in a histogram of statistical feature values of image patches associated with an image-channel image.

Some embodiments of the present invention described in relation to FIG. 26 comprise a method 400 for estimating additive noise in a still image or in a frame of a video sequence.

In these embodiments, a statistical feature value may be computed 402 for each image patch in a plurality of image patches of an image-channel image associated with an input image. Exemplary image-channel images are a luminance image, a chrominance image, an R-component image of an RGB image, a G-component image of an RGB image, a B-component image of an RGB image, a chroma-channel image in an image color space comprising a chroma channel, a combination of image channels, and other image-channel images. The image-channel image may be denoted $I(x,y)$, where x and y may denote the horizontal and vertical indices, respectively, and $I(x, y)$ may denote the image-channel image value at an image location corresponding to $(x,y)$.

In some embodiments of the present invention, each patch may be an N×N patch. In some embodiments of the present invention, the patches of the image-channel image may be overlapping patches. In some embodiments of the present invention, the plurality of images patches of the image-channel image may comprise all possible N×N patches in the image-channel image. In some embodiments of the present invention, N may be five pixels.

In alternative embodiments of the present invention, the plurality of image patches may comprise all image patches, whereat the value of a pixel, on which an image patch is centered, meets a first criterion. In some exemplary embodiments, the plurality of image patches may comprise all N×N image patches, whereat the center value of the image patch meets a first criterion. In some exemplary embodiments, the plurality of image patches may comprise all N×N image patches, whereat the center value of the image patch corresponds to a luminance value in the range [luma_low, luma_high], where luma_low is a first luminance value denoting a lower-limit on a range of luminance values and luma_high is a second luminance value denoting an upper-limit on the range of luminance values. Exemplary ranges are [16, 235] and [16, 240].

In alternative embodiments of the present invention, the plurality of image patches may comprise all image patches for which a characteristic of an image patch meets a first criterion.

In some embodiments of the present invention, the image-channel image may be computed from an input image, for example, from an image in an RGB, or other, color space. In some embodiments of the present invention, the image-channel image may be a combination of image channels.

In some embodiments of the present invention, the statistical feature value may be a standard-deviation value. In alternative embodiments, the statistical feature value may be another statistic, for example, the variance, the sum of absolute differences, and other statistical values. In embodiments wherein the statistical feature value is a standard-deviation value, the standard-deviation value, which may be denoted $STD_P$, of an image patch, which may be denoted P and for which Px and Py may denote the sets of x and y indices, respectively, corresponding to the pixel locations, in the image-channel image, within patch P, may be computed according to:

$$Mean_P = \sum_{Px} \sum_{Py} \frac{I(x, y)}{N \cdot N}$$

$$Mean2_P = \sum_{Px} \sum_{Py} \frac{I(x, y)^2}{N \cdot N}$$

$$STD_P = sqrt(Mean2_P - Mean_P^2),$$

where sqrt(·) may denote the square-root function.

A histogram of the statistical feature values computed for the image-channel patches may be formed 404. In some embodiments of the present invention, the histogram may be formed by accumulating the statistical feature values for all image patches. In alternative embodiments of the present invention, the histogram may be formed by accumulating the statistical feature values for all image patches into an initial histogram and smoothing the initial histogram. In some of these embodiments, the initial histogram may be smoothed using a moving-window averaging function. In alternative embodiments, an alternative smoothing method known in the art may be used to smooth the initial histogram.

The histogram may be searched 406 for a first significant peak, where the first significant peak is a significant peak whereat the bin location of the significant peak corresponds to the smallest statistical feature value compared to that of other significant peaks. In some embodiments of the present invention, a histogram peak may be identified using a peak-search window function at each histogram-bin location. A location may be considered a peak location if the histogram count associated with the leftmost histogram-bin location in the peak-search window is greater than the histogram count associated with the rightmost histogram-bin location in the peak-search window. In some embodiments of the present invention, a peak may be considered significant when the number of histogram counts within a significance-determination window centered at the peak location meets a first criterion. In some embodiments of the present invention, a peak may be considered a significant peak if the number of histogram counts within the significance-determination window is greater than 66 percent of the number of pixels in the luminance image. A person of ordinary skill in the art will recognize the existence of many methods and systems for locating a significant peak within a histogram. The above-described methods are for illustration purposes and should not be considered a limitation of embodiments of the present invention.

A determination may be made 408 as to whether or not a first significant peak has been found. If no significant peak has been found 410, then the noise estimate may be set 412 to a default value. In some embodiments of the present invention wherein the noise estimation is for a frame of a video sequence, the default value may be a noise estimate from a previous frame. In some embodiments, the noise estimate may be from the immediately previous frame. In alternative embodiments, the default value may be a last reliable noise estimate from a previous frame. In some embodiments of the present invention wherein the noise estimation is for a still image, the default value may be set to a pre-determined value.

The noise estimate may be labeled 414 with a label indicating a "low confidence" in the accuracy and validity of the noise estimate.

The noise-estimation process 400 may end 416.

If a first significant peak is identified 418, then a peak-width measure may be computed 420. In some embodiments of the present invention, the peak-width measure may be computed by determining the position within the histogram, prior to the first-significant-peak location, whereat the histogram count falls below a predetermined threshold and subtracting that location from the first-significant-peak location. In some embodiments of the present invention, the predetermined threshold may be related to the histogram count at the first-significant-peak location. In some embodiments of the present invention, the threshold may be 50% of the histogram count at the first-significant-peak location.

A determination may be made 422 as to whether or not the peak-width measure indicates a broad peak. In some embodiments of the present invention, the peak-width measure may be compared to a width threshold, and if the peak-width measure is greater than the width threshold, then the peak may be considered a broad peak. If the first significant peak is considered a broad peak 424, then the noise estimate may be set 412 to a default value. In some embodiments of the present invention wherein the noise estimation is for a frame of a video sequence, the default value may be a noise estimate from a previous frame. In some embodiments, the noise estimate may be from the immediately previous frame. In alternative embodiments, the default value may be a last reliable noise estimate from a previous frame. In some embodiments of the present invention wherein the noise estimation is for a still image, the default value may be set to a pre-determined value.

The noise estimate may be labeled 414 with a label indicating a "low confidence" in the accuracy and validity of the noise estimate.

The noise-estimation process 400 may end 416.

If the first significant peak is not considered a broad peak 426, then a noise estimate may be computed 428 based on the first-significant-peak location and the peak-width measure, and the noise-estimation process 400 may end 416.

In some embodiments of the present invention, the noise estimate may be computed 428 by combining the statistical feature value corresponding to the histogram bin, prior to the first-significant-peak location, whereat the histogram count falls below the predetermined threshold with the statistical feature value corresponding to the first-significant-peak location. In some embodiments of the present invention, the noise estimate may be computed 428 by subtracting the statistical feature value corresponding to the histogram bin, prior to the first-significant-peak location, whereat the histogram count falls below the predetermined threshold from the statistical feature value corresponding to the first-significant-peak location and combining the difference with the statistical feature value corresponding to the first-significant-peak location. In alternative embodiments, a factor of the difference between the statistical feature value corresponding to the histogram bin, prior to the first-significant-peak location, whereat the histogram count falls below the predetermined threshold and the statistical feature value corresponding to the first-significant-peak location may be combined with the statistical feature value corresponding to the first-significant-peak location. In some embodiments of the present invention, combining the values may comprise adding the values together.

Figure 27:
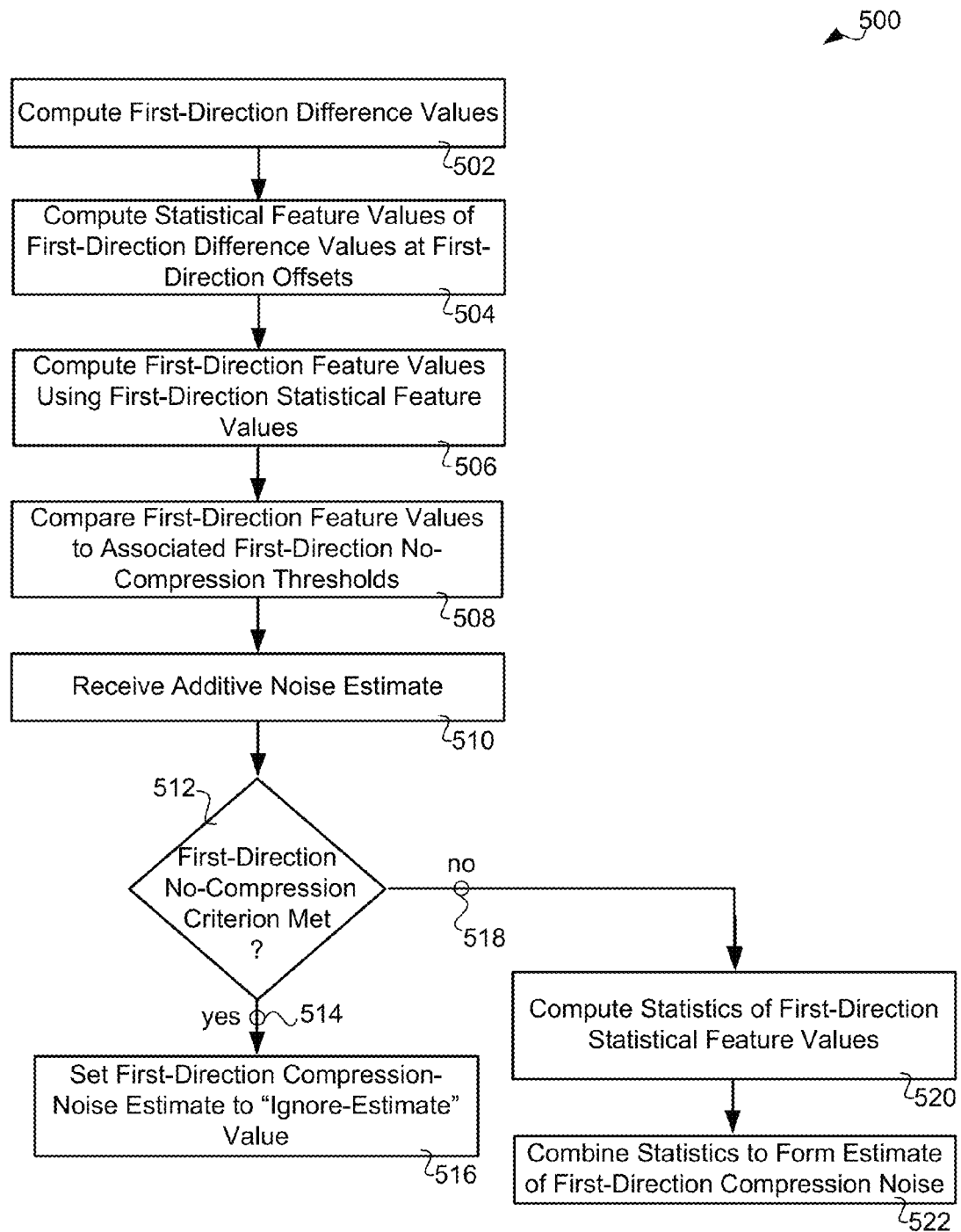
FIG. 27 is a chart showing exemplary embodiments of the present invention comprising methods for estimating compression noise in accordance with a criterion based on at least one feature value computed from statistical feature values corresponding to offsets in a first direction in a difference image and an additive noise estimate.

Some embodiments of the present invention described in relation to FIG. 27 may comprise a method 500 for detecting and estimating compression noise in an image or in a video sequence.

In these embodiments, a difference value, in a first direction, at each point in an image-channel image may be computed 502, thereby producing a plurality of first-direction difference values. Exemplary image-channel images are a luminance image, a chrominance image, an R-component image of an RGB image, a G-component image of an RGB image, a B-component image of an RGB image, a chroma-channel image in an image color space comprising a chroma channel, a combination of image channels, and other image-channel images.

In some embodiments of the present invention, the image-channel image may be computed from an input image, for example, from an image in an RGB, or other, color space.

A statistical feature value, for example, a standard-deviation value, a variance value, a sum-of-absolute-differences value and other statistical feature value, of the first-direction difference values at an offset in the first direction may be computed 504 for each of the offsets in a plurality of first-direction offsets, thereby producing a plurality of first-direction statistical feature values.

In some embodiments of the present invention, a statistical feature value may be calculated for each offset, in the first direction, within a coding block. The number of offsets may be determined by the structure of the image, or video, codec and any processing or scaling of the decoded data that may be performed prior to estimating the compression noise.

One, or more, first-direction feature values may be computed 506 using the computed statistical feature values for the first-direction offsets, also considered the first-direction statistical feature values and denoted $SF_{D1}[i]$, wherein i may correspond to a first-direction offset value.

In some embodiments of the present invention, a first-direction near-peak-value feature value may be computed by determining the number of first-direction statistical feature values that are close to the maximum first-direction statistical feature value. This first-direction near-peak-value feature value may be referred to as the NearPeakD1 value and may be determined by counting the number of first-direction statistical feature values satisfying:

$$SF_{D1}[i] \geq T_{D1\_CLOSE} SF_{D1\_MAX},$$

where $SF_{D1\_MAX} = \max_i(SF_{D1}[i])$, i corresponds to a first-direction offset, max (·) denotes the maximum function and $T_{D1\_CLOSE}$ is a closeness threshold. In some embodiments of the present invention, $T_{D1\_CLOSE}=0.99$.

In some embodiments of the present invention, a first-direction variance feature value may be the value of the variance of the first-direction statistical feature values, which may be denoted $VAR_{D1}$.

In an exemplary embodiment comprising the use of ND1 offsets, the variance of the first-direction statistical feature values may be computed according to:

$$SF_{D1\_MEAN} = \sum_{i=0}^{ND1-1} \frac{SF_{D1}[i]}{ND1}$$

$$SF2_{D1\_MEAN} = \sum_{i=0}^{ND1-1} \frac{(SF_{D1}[i])^2}{ND1}$$

$$VAR_{D1} = SF2_{D1\_MEAN} - SF_{D1\_MEAN}^2.$$

In some embodiments of the present invention, a first-direction block-boundaries feature may relate to an estimate of the locations of first-direction block boundaries in a plurality of video frames in a video sequence.

In an exemplary embodiment, a first-direction block boundary location may be estimated using the maximum first-direction statistical feature value according to:

$$Block_{D1}[\text{frame\_num}] = i, \text{ where } \max_i(SF_{D1}[i]) == SF_{D1}[i],$$

where frame_num may denote a time index associated with a video frame.

The number of unique first-direction block-boundary locations, which may be referred to as NumBlockLocsD1, may be determined by counting the number of unique values for $Block_{D1}[j]$, where j is an index with values from frame_num to frame_num−N and N is a constant.

The first-direction feature values computed using the first-direction statistical feature values may each be compared 508 to an associated threshold, wherein the threshold may be selected to delineate between feature values indicative of an image, or video frame, compressed in the first direction, and those indicative of an image, or video frame, uncompressed in the first direction.

An additive noise estimate may be received 510. A determination may be made 512 to whether or not the first-direction feature values and the additive noise estimate meet a first-direction no-compression criterion based on the received additive noise estimate and the comparisons of the first-direction feature values to the associated thresholds.

If the first-direction no-compression criterion is met 514, then a first-direction compression-noise estimate may be set 516 to an "ignore-estimate" value indicating that the first-direction compression-noise estimate may be ignored. In some embodiments of the present invention, the first-direction compression-noise estimate may be set 516 to zero to indicate that the first-direction compression-noise estimate may be ignored.

If the first-direction no-compression criterion is not met 518, then one, or more, statistics may be computed 520 from the first-direction statistical feature values.

In some embodiments of the present invention, the average of the first-direction statistical feature values and the maximum first-direction statistical feature value may be computed. These values may be computed according to:

$$SF_{D1\_MEAN} = \sum_{i=0}^{ND1-1} \frac{SF_{D1}[i]}{ND1}$$

$$SF_{D1\_MAX} = \max_i(SF_{D1}[i]), i = 0 \ldots ND1-1,$$

respectively, wherein ND1 is the number of first-direction offsets. In alternative embodiments, other statistical values may be calculated, for example, the median, the skew, the kurtosis and other statistical measures.

The computed statistics associated with the first-direction statistical feature values may be combined 522 to form an estimate of the first-direction compression noise.

In an exemplary embodiment of the present invention, an estimate of the first-direction compression noise may be calculated according to a weighted average given by:

$$\text{Noise}_{Compression\_D1} = 4.64 \cdot SF_{D1\_MAX} - 4.26 \cdot SF_{D1\_MEAN} + 0.58,$$

where the values 4.64, 4.26 and 0.58 are exemplary weighting parameters. In alternative embodiments, other weighting values may be used.

For example, in an alternative exemplary embodiment of the present invention, an estimate of the first-direction compression noise may be calculated according to a weighted average given by:

$$\text{Noise}_{Compression\_D1} = 1.6005 \cdot SF_{D1\_MAX} - 1.0764 \cdot SF_{D1\_MEAN} + 2.7259.$$

In an exemplary embodiment of the present invention, a first-direction near-peak-value feature value, NearPeakD1, may be compared to a first-direction near-peak-value threshold, and if the first-direction near-peak-value feature value is above the first-direction near-peak-value threshold, then the first-direction near-peak-value feature value may indicate an image, or video frame uncompressed in the first direction. In some exemplary embodiments, the first-direction near-peak-value threshold may be 50% of the number of first-direction offsets. In some exemplary embodiments wherein the statistical feature value is the standard-deviation value, if NearPeakD1>2, then no compression in the first direction may be indicated.

In an exemplary embodiment of the present invention, a first-direction variance feature value, $VAR_{D1}$, may be compared to a first-direction variance threshold, and if $VAR_{D1}$ is below the first-direction variance threshold, then the first-direction variance feature value may indicate an image, or video frame, uncompressed in the first direction. In some exemplary embodiments wherein the statistical feature value is the standard-deviation value, if $VAR_{D1}<0.6$, then no compression in the first direction may be indicated.

In an exemplary embodiment of the present invention, a first-direction block-boundaries feature value, NumBlockLocsD1, may be compared to a first-direction block-boundaries threshold, and if NumBlockLocsD1 is above the first-direction block-boundaries threshold, then the first-direction block-boundaries feature value may indicate an image, or video frame, uncompressed in the first direction. In some exemplary embodiments wherein the statistical feature value is the standard-deviation value, if NumBlockLocsD1>2, when five temporal frames are examined, then no compression in the first direction may be indicated.

In an exemplary embodiment of the present invention, if the received additive noise estimate is labeled a reliable estimate, then the indication is uncompressed image, or video frame.

In an exemplary embodiment of the present invention, if the received additive noise estimate is greater than an additive-noise-estimate threshold, then the indication is uncompressed image, or video frame.

In some exemplary embodiments of the present invention, when a first-direction near-peak-value feature value indicates no first-direction compression OR a first-direction variance feature value indicates no first-direction compression OR a third first-direction block-boundaries feature value indicates no first-direction compression OR the additive-noise estimate is reliable OR is greater than an associated threshold value, then the first-direction compression-noise estimate may be set to an "ignore-estimate" value indicating that the first-direction compression-noise estimate may be ignored. Otherwise, the first-direction compression-noise estimate may be computed by combining one, or more, statistics computed using the first-direction statistical feature values.

In some embodiments of the present invention, the first direction may be the horizontal direction. In alternative embodiments of the present invention, the first direction may be the vertical direction.

In alternative embodiments 600 of the present invention described in relation to FIG. 28, the process for estimation of compression noise in a first direction additionally may be performed in a second direction.

In these embodiments, a difference value, in a first direction, at each point in an image-channel image may be computed 602, thereby producing a plurality of first-direction difference values, and a difference value, in a second direction, at each point in the image-channel may be computed 622, thereby producing a plurality of second-direction difference values.

In some exemplary embodiments of the present invention, a first direction may be a horizontal direction and a second direction may be a vertical direction. In these embodiments, horizontal difference values and vertical difference values may be computed 602, 622 according to:

$$D_H(r,c) = I(r,c+1) - I(r,c)$$

and $$D_V(r,c) = I(r+1,c) - I(r,c),$$

respectively, where I(r,c) may denote the image-channel image, r and c may denote the row and column indices, respectively, $D_H(r,c)$ may denote a horizontal difference value at pixel location (r,c) and $D_V(r,c)$ may denote a vertical difference value at pixel location (r,c).

In some embodiments of the present invention, the image-channel image may be computed from an input image, for example, from an image in an RGB, or other,color space.

A statistical feature value, for example, a standard-deviation value, a variance value, a sum-of-absolute-differences value and other statistical feature value, of the first-direction difference values at a first-direction offset may be computed 604 for each of the first-direction offsets in a plurality of first-direction offsets, thereby producing a plurality of first-direction statistical feature values, and a statistical feature value, for example, a standard-deviation value, a variance value, a sum-of-absolute-differences value and other statistical feature value, of the second-direction difference values at a second-direction offset may be computed 624 for each of the second-direction offsets in a plurality of second-direction offsets, thereby producing a plurality of second-direction statistical feature values.

In some embodiments of the present invention, a statistical feature value may be calculated for each offset within a coding block, thereby producing a plurality of horizontal statistical feature values and a plurality of vertical statistical feature values. The number of offsets may be determined by the structure of the image, or video, codec and any processing or scaling of the decoded data that may be performed prior to estimating the compression noise.

In some embodiments of the present invention, the number of offsets in the first direction may be the same as the number of offsets in the second direction. In some of these embodiments, the offset values may be the same in each direction. In alternative of these embodiments, the offset values may be different in each direction.

In alternative embodiments of the present invention, the number of offsets in the first direction may be different than the number of offsets in the second direction.

In an exemplary embodiment comprising the use of eight offsets and wherein the first direction is the horizontal direction and the statistical feature value in the horizontal direction is the standard-deviation value and the second direction is the vertical direction and the statistical feature value in the vertical direction is the standard-deviation value, the standard-deviation values of the horizontal differences may be calculated 604, for an image of width denoted NumCols and height denoted NumRows, according to:

$$Mean_H[i] = \sum_{r=0}^{NumRows} \sum_{c=0}^{NumCols/8} \frac{D_H(r, 8 \cdot c + i)}{NumRows \cdot (NumCols/8)},$$

$$i = 0 \ldots 7$$

$$Mean2_H[i] = \sum_{r=0}^{NumRows} \sum_{c=0}^{NumCols/8} \frac{D_H(r, 8 \cdot c + i)^2}{NumRows \cdot (NumCols/8)},$$

$$i = 0 \ldots 7$$

$$STD_H[i] = sqrt(Mean2_H[i] - Mean_H[i]^2),$$

$$i = 0 \ldots 7,$$

where i denotes a horizontal offset and $STD_H[i]$ denotes a horizontal standard-deviation value associated with the horizontal offset denoted by i.

Correspondingly, in this exemplary embodiment, the standard-deviation values of the vertical differences may be calculated 624, for an image of width denoted NumCols and height denoted NumRows, according to:

$$Mean_V[i] = \sum_{r=0}^{NumRows/8} \sum_{c=0}^{NumCols} \frac{D_V(8 \cdot r + i, c)}{(NumRows/8) \cdot NumCols},$$

$$i = 0 \ldots 7$$

$$Mean2_V[i] = \sum_{r=0}^{NumRows/8} \sum_{c=0}^{NumCols} \frac{D_V(8 \cdot r + i, c)^2}{(NumRows/8) \cdot NumCols},$$

$$i = 0 \ldots 7$$

$$STD_V[i] = sqrt(Mean2_V[i] - Mean_V[i]^2),$$

$$i = 0 \ldots 7,$$

where i denotes a horizontal offset and $STD_H[i]$ denotes a horizontal standard-deviation value associated with the horizontal offset denoted by i.

FIG. 11 depicts an exemplary portion of an image 160 with pixel locations shown as squares. The pixel locations shown in cross hatch, for example 162, may illustrate the locations used for computing the horizontal standard-deviation value associated with an offset of zero, $STD_H[0]$, and the pixel locations shown in white, for example 164, may illustrate the locations used for computing the horizontal standard-deviation value associated with an offset of two, $STD_H[2]$.

One, or more, first-direction features values may be computed 606 using the computed statistical feature values for the first-direction offsets, also considered the first-direction statistical feature values and denoted $SF_{D1}[i]$ where i=0, ..., ND1−1 and ND1 is the number of offsets in the first direction, and one, or more, second-direction feature values may be computed 626 using the computed statistical feature values for the second-direction offsets, also considered the second-direction statistical feature values and denoted $SF_{D2}[i]$ where i=0, ..., ND2−1 and ND2 is the number of offsets in the second direction.

In some embodiments of the present invention, a first-direction near-peak-value feature value may be computed by determining the number of first-direction statistical feature values that are close to the maximum first-direction statistical feature value. This first-direction near-peak-value feature value may be referred to as the NearPeakD1 value and may be determined by counting the number of first-direction statistical feature values satisfying:

$$SF_{D1}[i] \geq T_{D1\_CLOSE} SF_{D1\_MAX},$$

where $SF_{D1\_MAX} = \max_i(SF_{D1}[i])$, i corresponds to a first-direction offset, max(·) denotes the maximum function and $T_{D1\_CLOSE}$ is a closeness threshold. In some embodiments of the present invention $T_{D1\_CLOSE}=0.99$.

In some embodiments of the present invention, a second-direction near-peak-value feature value may be computed by determining the number of second-direction statistical feature values that are close to the maximum second-direction statistical feature value. This second-direction near-peak-value feature value may be referred to as the NearPeakD2 value and may be determined by counting the number of second-direction standard-deviation values satisfying:

$$SF_{D2}[i] \geq T_{D2\_CLOSE} SF_{D2\_MAX},$$

where $SF_{D2\_MAX} = \max_i(SF_{D2}[i])$, i corresponds to a second-direction offset, max(·) denotes the maximum function and $T_{D2\_CLOSE}$ is a closeness threshold. In some embodiments of the present invention $T_{D2\_CLOSE}=0.99$.

In some embodiments of the present invention, a first-direction variance feature value may be the value of the variance of the first-direction statistical feature values, which may be denoted $VAR_{D1}$.

In an exemplary embodiment comprising the use of ND1 offsets, the variance of the first-direction statistical feature values may be computed according to:

$$SF_{D1\_MEAN} = \sum_{i=0}^{ND1-1} \frac{SF_{D1}[i]}{ND1}$$

$$SF2_{D1\_MEAN} = \sum_{i=0}^{ND1-1} \frac{(SF_{D1}[i])^2}{ND1}$$

$$VAR_{D1} = SF2_{D1\_MEAN} - SF_{D1\_MEAN}^2.$$

In some embodiments of the present invention, a second-direction variance feature value may be the value of the variance of the second-direction statistical feature values, which may be denoted $VAR_{D2}$.

In an exemplary embodiment comprising the use of ND2 offsets, the variance of the second-direction statistical feature values may be computed according to:

$$SF_{D2\_MEAN} = \sum_{i=0}^{ND2-1} \frac{SF_{D2}[i]}{ND2}$$

-continued $$SF2_{D2\_MEAN} = \sum_{i=0}^{ND2-1} \frac{(SF_{D2}[i])^2}{ND2}$$

$$VAR_{D2} = SF2_{D2\_MEAN} - SF^2_{D2\_MEAN}.$$

In an exemplary embodiment comprising the use of eight offsets, the variance of the horizontal statistical feature values may be computed according to:

$$SF_{H\_MEAN} = \sum_{i=0}^{7} \frac{SF_H[i]}{8}$$

$$SF2_{H\_MEAN} = \sum_{i=0}^{7} \frac{(SF_H[i])^2}{8}$$

$$VAR_H = SF2_{H\_MEAN} - SF^2_{H\_MEAN}$$

and the variance of the vertical statistical feature values may be computed according to:

$$SF_{V\_MEAN} = \sum_{i=0}^{7} \frac{SF_V[i]}{8}$$

$$SF2_{V\_MEAN} = \sum_{i=0}^{7} \frac{(SF_V[i])^2}{8}$$

$$VAR_V = SF2_{V\_MEAN} - SF^2_{V\_MEAN}.$$

In some embodiments of the present invention, a first-direction block-boundaries feature may relate to an estimate of the locations of first-direction block boundaries in a plurality of video frames in a video sequence.

In an exemplary embodiment, a first-direction block boundary location may be estimated using the maximum first-direction statistical feature value according to:

$$Block_{D1}[\text{frame\_num}] = i, \text{ where } \max_i(SF_{D1}[i]) == SF_{D1}[i],$$

where frame_num may denote a time index associated with a video frame.

The number of unique first-direction block-boundary locations, which may be referred to as NumBlockLocsD1, may be determined by counting the number of unique values for $Block_{D1}[j]$, where j is an index with values from frame_num to frame_num−N and N is a constant.

In some embodiments of the present invention, a second-direction block-boundaries feature may relate to an estimate of the locations of second-direction block boundaries in a plurality of video frames in a video sequence.

In an exemplary embodiment, a second-direction block boundary location may be estimated using the maximum second-direction statistical feature value according to:

$$Block_{D2}[\text{frame\_num}] = i, \text{ where } \max_i(SF_{D2}[i]) == SF_{D2}[i],$$

where frame_num may denote a time index associated with a video frame.

The number of unique second-direction block-boundary locations, which may be referred to as NumBlockLocsD2, may be determined by counting the number of unique values for $Block_{D2}$ [j], where j is an index with values from frame_num to frame_num−N and N is a constant.

The first-direction feature values computed using the first-direction statistical feature values may each be compared 608 to an associated threshold, wherein the threshold may be selected to delineate between feature values indicative of an image, or video frame, compressed in the first direction and those indicative of an image, or video frame, uncompressed image in the first direction. The second-direction feature values computed using the vertical statistical feature values may each be compared 628 to an associated threshold, wherein the threshold may be selected to delineate between feature values indicative of an image, or video frame, compressed in the second direction and those indicative of an image, or video frame, uncompressed in the second direction.

An additive noise estimate may be received 610, 630. A determination may be made 612 to whether or not the first-direction feature values and the additive noise estimate meet a first-direction no-compression criterion based on the received additive noise estimate and the comparisons of the first-direction feature values to the associated thresholds. A determination may be made 632 to whether or not the second-direction feature values and the additive noise estimate meet a second-direction no-compression criterion, based on the second-direction feature value/threshold comparisons and the received additive noise estimate.

If the first-direction no-compression criterion is met 614, then a first-direction compression-noise estimate may be set 616 to an "ignore-estimate" value indicating that the first-direction compression-noise estimate may be ignored. In some embodiments of the present invention, the first-direction compression-noise estimate may be set 616 to zero to indicate that the first-direction compression-noise estimate may be ignored. If the second-direction no-compression criterion is met 634, then a second-direction compression-noise estimate may be set 636 to an "ignore-estimate" value indicating that the second-direction compression-noise estimate may be ignored. In some embodiments of the present invention, the first-direction compression-noise estimate may be set 636 to zero to indicate that the second-direction compression-noise estimate may be ignored. In some embodiments of the present invention, an "ignore-estimate" value used to indicate that the first-direction compression-noise estimate may be ignored may be the same as an "ignore-estimate" value used to indicate that the second-direction compression-noise estimate may be ignored. In some embodiments of the present invention, an "ignore-estimate" value used to indicate that the first-direction compression-noise estimate may be ignored may be different than an "ignore-estimate" value used to indicate that the second-direction compression-noise estimate may be ignored.

If the first-direction no-compression criterion is not met 640, then statistics may be computed 642 for the first-direction statistical feature values. If the second-direction no-compression criterion is not met 650, then statistics may be computed 652 for the second-direction statistical feature values.

In some exemplary embodiments of the present invention, the average of the horizontal statistical feature values and the maximum horizontal statistical feature value may be computed, and the average of the vertical statistical feature values and the maximum vertical statistical feature value may be computed. These values may be computed according to:

$$SF_{H\_MEAN} = \sum_{i=0}^{NH-1} \frac{SF_H[i]}{NH}$$

$$SF_{H\_MAX} = \max_i(SF_H[i]), i = 0 \ldots NH-1$$

$$SF_{V\_MEAN} = \sum_{i=0}^{NV-1} \frac{SF_V[i]}{NV}$$

$$SF_{V\_MAX} = \max_i(SF_V[i]), i = 0 \ldots NV-1,$$

respectively, wherein NH and NV are the number of horizontal and vertical offsets, respectively. In alternative embodiments, other statistical values may be calculated, for example, the median, the skew, the kurtosis and other statistical measures.

The computed statistics associated with the first-direction statistical feature values may be combined 644 to form an estimate of the first-direction compression noise. The computed statistics associated with the second-direction statistical feature values may be combined 654 to form an estimate of the second-direction compression noise.

In an exemplary embodiment of the present invention, an estimate of the horizontal compression noise may be calculated according to a weighted average given by:

$$\text{Noise}_{Compression\_H} = 4.64 \cdot SF_{H\_MAX} - 4.26 \cdot SF_{H\_MEAN} + 0.58,$$

and an estimate of the vertical compression noise may be calculated according to a weighted average given by:

$$\text{Noise}_{Compression\_V} = 4.64 \cdot SF_{V\_MAX} - 4.26 \cdot SF_{V\_MEAN} + 0.58,$$

where the values 4.64, 4.26 and 0.58 are exemplary weighting parameters. In alternative embodiments, other weighting values may be used.

For example, in an alternative exemplary embodiment of the present invention, an estimate of the horizontal compression noise may be calculated according to a weighted average given by:

$$\text{Noise}_{Compression\_H} = 1.6005 \cdot SF_{H\_MAX} - 1.0764 \cdot SF_{H\_MEAN} + 2.7259,$$

and an estimate of the vertical compression noise may be calculated according to a weighted average given by:

$$\text{Noise}_{Compression\_V} = 1.6005 \cdot SF_{V\_MAX} - 1.0764 \cdot SF_{V\_MEAN} + 2.7259.$$

The estimate for the first-direction compression noise and the estimate for the second-direction compression noise may be combined 660 to form a single compression noise estimate. Any data fusion method known in the art may be used to combine the estimate for the first-direction compression noise and the estimate for the second-direction compression noise.

In some exemplary embodiments of the present invention, the compression-noise estimate may be determined according to:

$$\text{Noise}_{Compression} = \max(\text{Noise}_{Compression\_H}, \text{Noise}_{Compression\_V}).$$

In an exemplary embodiment of the present invention, a first-direction near-peak-value feature value, NearPeakD1, may be compared to a first-direction near-peak-value threshold, and if the first-direction near-peak-value feature value is above the first-direction near-peak-value threshold, then the first-direction near-peak-value feature value may indicate an image, or video frame, uncompressed in the first direction. In some exemplary embodiments, the first-direction near-peak-value threshold may be 50% of the number of first-direction offsets. In some exemplary embodiments wherein the statistical feature value is the standard-deviation value, if NearPeakD1>2, then no compression in the first direction may be indicated. In an exemplary embodiment of the present invention, a second-direction near-peak-value feature value, NearPeakD2, may be compared to a second-direction near-peak-value threshold, and if the second-direction near-peak-value feature value is above the second-direction near-peak-value threshold, then the second-direction near-peak-value feature value may indicate an image, or video frame, uncompressed in the second direction. In some exemplary embodiments, the second-direction near-peak-value threshold may be 50% of the number of second-direction offsets. In some exemplary embodiments wherein the statistical feature value is the standard-deviation value, if NearPeakD2>2, then no compression in the second direction may be indicated.

In an exemplary embodiment of the present invention, a first-direction variance feature value, $VAR_{D1}$, may be compared to a first-direction variance threshold, and if $VAR_{D1}$ is below the first-direction variance threshold, then the first-direction variance feature value may indicate an image, or video frame, uncompressed in the first direction. In some exemplary embodiments wherein the statistical feature value is the standard-deviation value, if $VAR_{D1}$<0.6, then no compression in the first direction may be indicated.

In an exemplary embodiment of the present invention, a second-direction variance feature value, $VAR_{D2}$, may be compared to a second-direction variance threshold, and if $VAR_{D2}$ is below the second-direction variance threshold, then the second-direction variance feature value may indicate an image, or video frame, uncompressed in the second direction. In some exemplary embodiments wherein the statistical feature value is the standard-deviation value, if $VAR_{D2}$<0.6, then no compression in the second direction may be indicated.

In an exemplary embodiment of the present invention, a first-direction block-boundaries feature value, NumBlockLocsD1, may be compared to a first-direction block-boundaries threshold, and if NumBlockLocsD1 is above the first-direction block-boundaries threshold, then the first-direction block-boundaries feature value may indicate an image, or video frame, uncompressed in the first direction. In some exemplary embodiments wherein the statistical feature value is the standard-deviation value, if NumBlockLocsD1>2, when five temporal frames are examined, then no compression in the first direction may be indicated.

In an exemplary embodiment of the present invention, a second-direction block-boundaries feature value, NumBlockLocsD2, may be compared to a second-direction block-boundaries threshold, and if NumBlockLocsD2 is above the second-direction block-boundaries threshold, then the second-direction block-boundaries feature value may indicate an image, or video frame, uncompressed in the second direction. In some exemplary embodiments wherein the statistical feature value is the standard-deviation value, if NumBlockLocsD2>2, when five temporal frames are examined, then no compression in the second direction may be indicated.

In an exemplary embodiment of the present invention, if the received additive noise estimate is labeled a reliable estimate, then the indication is uncompressed image, or video frame.

In an exemplary embodiment of the present invention, if the received additive noise estimate is greater than an additive-noise-estimate threshold, then the indication is uncompressed image, or video frame.

In some exemplary embodiments of the present invention, when a first-direction near-peak-value feature value indicates no first-direction compression OR a first-direction variance feature value indicates no first-direction compression OR a first-direction block-boundaries feature value indicates no first-direction compression OR the additive-noise estimate is reliable OR is greater than an associated threshold value, then the first-direction compression-noise estimate may be set to an "ignore-estimate" value indicating that the first-direction compression-noise estimate may be ignored. Otherwise, the first-direction compression-noise estimate may be computed by combining one, or more, statistics computed using the first-direction standard-deviation values.

In some exemplary embodiments of the present invention, when a second-direction near-peak-value feature value indicates no second-direction compression OR a second-direction variance feature value indicates no second-direction compression OR a second-direction block-boundaries feature value indicates no second-direction compression OR the additive-noise estimate is reliable OR is greater than an associated threshold value, then the second-direction compression-noise estimate may be set to an "ignore-estimate" value indicating that the second-direction compression-noise estimate may be ignored. Otherwise, the second-direction compression-noise estimate may be computed by combining one, or more, statistics computed using the second-direction standard-deviation values.

In some embodiments of the present invention, corresponding thresholds in the first direction and the second direction may be the same. In alternative embodiments, corresponding thresholds in the first direction and the second direction may be different.

Some embodiments of the present invention described herein may comprise an edge-preserving filter. In some embodiments, the edge-preserving filter may comprise a bi-lateral filter. Alternative embodiments of the present invention may comprise a hierarchy, or bank, of edge-preserving filters. In some of the embodiments of the present invention comprising a hierarchy, or bank, of edge-preserving filters, the edge-preserving filters may be bi-lateral filters.

FIG. 29 depicts exemplary embodiments of the present invention comprising a hierarchy 700 of edge-preserving filters 704, 706, 708. In some of these exemplary embodiments, an input image 702, for example, a high-definition image or a 4K image, may be made available to first edge-preserving filter 704 and a second edge-preserving filter 706. The filtering parameter values 705, 707 for the first edge-preserving filter 704 and the second edge-preserving filter 706 may depend on noise statistics associated with the input image 702. In some embodiments of the present invention, the first edge-preserving filter 704 filtering parameter value 705 may be set to a first factor of a noise estimate of the noise in the input image 702, and the second edge-preserving filter 706 filtering parameter value 707 may be set to a second factor of the noise estimate of the noise in the input image 702. In some embodiments, the value of the second factor may be greater than the value of the first factor.

A first channel 710 may be generated by taking the difference 712 of the input image and the results 714 of the first edge-preserving filter 704. The first channel 710 may contain the image noise, and the first channel 710 may be attenuated or removed 716.

The second channel 718 may be generated by taking the difference 720 of the results 714 of the first edge-preserving filter 704 and the results 722 of the second edge-preserving filter 706. The second channel 718 may contain a combination of image noise and texture and may be attenuated 724 to reduce the noise content from the input image 702. The second channel 718 may not be removed completely in order to preserve the image texture.

A third channel 726 containing texture or significant features in the input image 702 may be generated by filtering the output 722 of the second edge-preserving filter 706 using a third edge-preserving filter 708 with a very high value of a filtering parameter 709 and subtracting 726 the results 728 of the third edge-preserving filter 708 from the second-edge-preserving-filter results 722. The third channel 726 may be sharpened, or enhanced, 730 to improve the details present in the input image 702. The results 728 of the third edge-preserving filter 708 may contain the structure of the input image 702.

The results 732 of the noise attenuation/removal, the results 734 of the attenuation of the noise and texture data 718, the sharpened 736, or enhanced, texture and significant features 726 and the image structure 728 may be combined 738 to form an enhanced image 740.

In some embodiments of the present invention, noise estimation methods and systems described herein may be used to determine a noise estimate on which the filtering parameters 705, 707, 709 may be based.

A person of ordinary skill in the art will recognize the existence of many edge-preserving filters and many forms of bi-lateral filters. A person of ordinary skill in the art will recognize the existence of many configurations of a hierarchy, or bank, of edge-preserving filters for separation of an input image into a plurality of channels. The exemplary filters described herein are for purposes of illustration and are not intended to limit the scope of the present invention.

Some embodiments of the present invention described in relation to FIG. 30 may comprise a method 800 for determining a mosquito-noise estimate at a first pixel location in an image. The image may be a luminance image, a chrominance image, an R-component image of an RGB image, a G-component image of an RGB image, a B-component image of an RGB image, a chroma-channel image in an image color space comprising a chroma channel, a combination of image channels, or another channel or combination of channels of a multi-channel image.

A ring parameter, which may be denoted ring_param, may be computed 802 for the image. In some embodiments of the present invention, the ring parameter may be based on an additive-noise estimate for the image and a compression-noise estimate for the image. In some embodiments of the present invention the ring parameter, ring_param, may be computed according to:

$$\text{ring\_param} = \frac{Noise_{Compression}}{Noise_{Compression} + Noise_{Additive}},$$

wherein Noise$_{Compression}$ may be an estimate of the compression noise within the image and Noise$_{Additive}$ may be an estimate of the additive noise within the image. In some embodiments of the present invention, the compression noise within the image may be estimated in accordance with the methods described herein. In alternative embodiments of the present invention, the compression noise within the image may be estimated in accordance with methods known in the art. In some embodiments of the present invention, the additive noise within the image may be estimated in accordance with the methods described herein. In alternative embodiments of the present invention, the additive noise within the image may be estimated in accordance with methods known in the art.

A statistic, which may be denoted W1, of a plurality of noise estimates corresponding to a plurality of pixel locations in a first region based on the first pixel location may be computed 804. Exemplary statistics include the mean, the median, the maximum and other statistical measures. In some embodiments of the present invention, the first region may be a window centered at the first pixel location. In some embodiments of the present invention, the first region may be a K×K window centered at the first pixel location. In these embodiments, the average of the noise estimates may be computed according to:

$$W1 = \sum_{i \in Px} \sum_{j \in Py} \frac{Noise_{i,j}}{K^2},$$

where W1 may denote the average of the noise estimates, Noise$_{i,j}$, in the K×K region centered at the first pixel location and where Px and Py may denote the x indices and y indices, respectively, of the pixels within the first region. In alternative embodiments, the first region may be another shape and/or size.

In some embodiments of the present invention, a noise estimate at a pixel location within the first region may be received from another process. In some alternative embodiments of the present invention, the noise estimate at a pixel location in the first region may be computed. In some of these alternative embodiments, a noise estimate for the entire image may be computed and the image noise estimate may be adjusted in accordance with all intervening filters to yield a noise estimate at each pixel location. In some of these alternative embodiments, a noise estimate for the entire image may be received from another process and the received image noise estimate may be adjusted in accordance with all intervening filters to yield a noise estimate at each pixel location. In some embodiments of the present invention, the noise estimate for the entire image may be computed in accordance with the methods described herein. In alternative embodiments of the present invention, the noise estimate for the entire image may be computed in accordance with methods known in the art.

A maximum activity value, which may be denoted W2, in a second region based on the first pixel location may be computed 806. In these embodiments, the maximum activity value may be computed according to:

$$W2 = \bigvee_{q \in Region2} \max(Activity_q),$$

where W2 may denote the maximum activity value, Activity$_q$ may denote the activity value at pixel location q in the second region, which may be denoted Region2. In some embodiments of the present invention, the second region may be a window centered at the first pixel location. In some embodiments of the present invention, the second region may be an M×M window centered at the first pixel location. In alternative embodiments, the second region may be another shape and/or size. In some embodiments of the present invention, the first region and the second region may be different regions. In alternative embodiments of the present invention, the first region and the second region may be the same region.

In some embodiments of the present invention, the activity measure associated with a pixel location may be a standard-deviation value computed from a plurality of pixel values in a region associated with the pixel location. In alternative embodiments, the activity measure may be another activity measure, for example, the variance, the sum of absolute differences, and other statistical values computed from the plurality pixel values in a region associated with the pixel location. In embodiments wherein the activity value is a standard-deviation value, the activity value, which may be denoted Activity$_P$, of an N×N image region, which may be denoted P and for which Px and Py may denote the x and y indices, respectively, corresponding to the pixel locations, in the image, within region P, may be computed according to:

$$Mean_P = \sum_{x \in Px} \sum_{y \in Py} \frac{I(x, y)}{N \cdot N}$$

$$Mean2_P = \sum_{x \in Px} \sum_{y \in Py} \frac{I(x, y)^2}{N \cdot N}$$

$$Activity_P = sqrt(Mean2_P - Mean_P^2),$$

where sqrt(·) may denote the square-root function and I(x,y) may denote the image value at location x,y.

A noise estimate, which may be denoted W3, may be received 808 for the first pixel location, also considered the pixel-of-interest. In some embodiments of the present invention, the noise estimate for the first pixel location may be received from another process. In alternative embodiments of the present invention, the noise estimate for the first pixel location may be computed and received in response to the computation. In some of these alternative embodiments, a noise estimate for the entire image may be computed and the image noise estimate may be adjusted in accordance with all intervening filters to yield a noise estimate at the first pixel location. In some of these alternative embodiments, a noise estimate for the entire image may be received from another process and the received image noise estimate may be adjusted in accordance with all intervening filters to yield a noise estimate at the first pixel location. In some embodiments of the present invention, the noise estimate for the entire image may be computed in accordance with the methods described herein. In alternative embodiments of the present invention, the noise estimate for the entire image may be computed in accordance with methods known in the art.

A combination of the statistic of the noise estimates at the plurality of pixel locations in the first region, the noise estimate at the first pixel location and a product of the maximum activity value at the plurality of pixel locations in the second region, the ring parameter and a multiplicative constant, which may be denoted C, may be computed 810. The mosquito-noise estimate at the first pixel location may be set 812 to the computed combined value. In some embodiments of the present invention, the combination may be the maximum of the statistic of the noise estimates at the plurality of pixel locations in the first region, the noise estimate at the first pixel location and the product of the maximum activity value at the plurality of pixel locations in the second region, the ring parameter and the multiplicative constant. In alternative embodiments, the combination may be a linear combination of the values. In some embodiments of the present invention, the value of the multiplicative constant, C, may be determined based on the desired amount of smoothing. In some embodiments of the present invention, the value of the multiplicative constant, C, may be a value between zero and one, where a value of C closer to one may effectuate greater smoothing than a value of C closer to zero. In alternative embodiments, the value of the multiplicative constant, C, may be a value outside of the range zero to one.

In alternative embodiments of the present invention described in relation to FIG. 31, the multiplicative constant, C, may be computed based on the computed maximum activity value, W2, in the second region based on the first pixel location.

Some embodiments of the present invention described in relation to FIG. 31 may comprise a method 900 for determining a mosquito-noise estimate at a first pixel location in an image. The image may be a luminance image, a chrominance image, an R-component image of an RGB image, a G-component image of an RGB image, a B-component image of an RGB image, a chroma-channel image in an image color space comprising a chroma channel, a combination of image channels, or another channel or combination of channels of a multi-channel image.

A ring parameter, which may be denoted ring_param, may be computed 902 for the image. In some embodiments of the present invention, the ring parameter may be based on an additive-noise estimate for the image and a compression-noise estimate for the image. In some embodiments of the present invention the ring parameter, ring_param, may be computed according to:

$$\text{ring\_param} = \frac{Noise_{Compression}}{Noise_{Compression} + Noise_{Additive}},$$

wherein $Noise_{compression}$ may be an estimate of the compression noise within the image and $Noise_{Additive}$ may be an estimate of the additive noise within the image. In some embodiments of the present invention, the compression noise within the image may be estimated in accordance with the methods described herein. In alternative embodiments of the present invention, the compression noise within the image may be estimated in accordance with methods known in the art. In some embodiments of the present invention, the additive noise within the image may be estimated in accordance with the methods described herein. In alternative embodiments of the present invention, the additive noise within the image may be estimated in accordance with methods known in the art.

A statistic, which may be denoted W1, of a plurality of noise estimates corresponding to a plurality of pixel locations in a first region based on the first pixel location may be computed 904. Exemplary statistics include the mean, the median, the maximum and other statistical measures. In some embodiments of the present invention, the first region may be a window centered at the first pixel location. In some embodiments of the present invention, the first region may be a K×K window centered at the first pixel location. In these embodiments, the average of the noise estimates may be computed according to:

$$W1 = \sum_{i \in Px} \sum_{j \in Py} \frac{Noise_{i,j}}{K^2},$$

where W1 may denote the average of the noise estimates, $Noise_{i,j}$, in the K×K region centered at the first pixel location and where Px and Py may denote the x indices and y indices, respectively, of the pixels within the first region. In alternative embodiments, the first region may be another shape and/or size.

In some embodiments of the present invention, a noise estimate at a pixel location within the first region may be received from another process. In some alternative embodiments of the present invention, the noise estimate at a pixel location in the first region may be computed. In some of these alternative embodiments, a noise estimate for the entire image may be computed and the image noise estimate may be adjusted in accordance with all intervening filters to yield a noise estimate at each pixel location. In some of these alternative embodiments, a noise estimate for the entire image may be received from another process and the received image noise estimate may be adjusted in accordance with all intervening filters to yield a noise estimate at each pixel location. In some embodiments of the present invention, the noise estimate for the entire image may be computed in accordance with the methods described herein. In alternative embodiments of the present invention, the noise estimate for the entire image may be computed in accordance with methods known in the art.

A maximum activity value, which may be denoted W2, in a second region based on the first pixel location may be computed 906. In these embodiments, the maximum activity value may be computed according to:

$$W2 = \bigvee_{q \in Region2} \max(Activity_q),$$

where W2 may denote the maximum activity value, $Activity_q$ may denote the activity value at pixel location q in the second region, which may be denoted Region2. In some embodiments of the present invention, the second region may be a window centered at the first pixel location. In some embodiments of the present invention, the second region may be an M×M window centered at the first pixel location. In alternative embodiments, the second region may be another shape and/or size. In some embodiments of the present invention, the first region and the second region may be different regions. In alternative embodiments of the present invention, the first region and the second region may be the same region.

In some embodiments of the present invention, the activity measure associated with a pixel location may be a standard-deviation value computed from a plurality of pixel values in a region associated with the pixel location. In alternative embodiments, the activity measure may be another activity measure, for example, the variance, the sum of absolute differences, and other statistical values computed from the plurality pixel values in a region associated with the pixel location. In embodiments wherein the activity value is a standard-deviation value, the activity value, which may be denoted Activity$_P$, of an N×N image region, which may be denoted P and for which Px and Py may denote the x and y indices, respectively, corresponding to the pixel locations, in the image, within region P, may be computed according to:

$$Mean_P = \sum_{x \in Px} \sum_{y \in Py} \frac{I(x, y)}{N \cdot N}$$

$$Mean2_P = \sum_{x \in Px} \sum_{y \in Py} \frac{I(x, y)^2}{N \cdot N}$$

$$Activity_P = sqrt(Mean2_P - Mean_P^2),$$

where sqrt(·) may denote the square-root function and I(x,y) may denote the image value at location x,y.

A noise estimate, which may be denoted W3, may be received 908 for the first pixel location, also considered the pixel-of-interest. In some embodiments of the present invention, the noise estimate for the first pixel location may be received from another process. In alternative embodiments of the present invention, the noise estimate for the first pixel location may be computed and received in response to the computation. In some of these alternative embodiments, a noise estimate for the entire image may be computed and the image noise estimate may be adjusted in accordance with all intervening filters to yield a noise estimate at the first pixel location. In some of these alternative embodiments, a noise estimate for the entire image may be received from another process and the received image noise estimate may be adjusted in accordance with all intervening filters to yield a noise estimate at the first pixel location. In some embodiments of the present invention, the noise estimate for the entire image may be computed in accordance with the methods described herein. In alternative embodiments of the present invention, the noise estimate for the entire image may be computed in accordance with methods known in the art.

A multiplicative constant, which may be denoted C, may be determined 910 based on the maximum activity value, W2, in the second region.

In some embodiments of the present invention, if the value of W2 meets a first criterion, then the value of C may be set to a first constant value, and if the value of W2 does not meet the first criterion, then the value of C may be set to a second constant value. In some embodiments of the present invention, the first criterion may be based on a comparison of the value of W2 with a first threshold.

In alternative embodiments of the present invention, the value of W2 may be compared to a first threshold, and when the value of W2 meets a first criterion relative to the first threshold, for example, W2>Th1 where Th1 may denote the first threshold, the multiplicative constant C may be set to a first constant value, for example, C1. If the value of W2 does not meet the first criterion relative to the first threshold, for example, W2≤Th1, then the value of W2 may be compared to a second threshold, and when the value of W2 meets a second criterion relative to the second threshold, for example, W2<Th2 where Th2 may denote the second threshold, the multiplicative constant C may be set to a second constant value, for example, C2. In some embodiments of the present invention, when the value of W2 falls between the two threshold values, then the multiplicative constant C may be set to a third constant value, for example, C3, wherein the value C3 is between the values C1 and C2. In alternative embodiments, when the value of W2 falls between the two threshold values, then the multiplicative constant C may be set to a third constant value, for example, C3, based on a smooth transition, for example, a linear transition, between the values C1 and C2. In yet alternative embodiments, when the value of W2 falls between the two threshold values, then the multiplicative constant C may be set to a third constant value, for example, C3, based on a smooth transition, for example, a linear transition, between the values C1 and a fourth constant value, which may be denoted C4, where the value of C4 lies between the values of C1 and C2. In some embodiments of the present invention, the constant values may be selected according to the relationship: C2<C1. In some embodiments of the present invention, the constant values may be selected according to the relationship: C2<C3<C1. In some embodiments of the present invention, the constant values may be selected according to the relationship: C2<C4<C1. In some embodiments of the present invention, the constant values may be determined based on the desired amount of smoothing. In some exemplary embodiments, a constant value may be a value between zero and one, where a constant value closer to one may effectuate greater smoothing than a constant value closer to zero. In alternative embodiments, a constant value may be a value outside of the range zero to one.

A combination of the statistic of the noise estimates at the plurality of pixel locations in the first region, the noise estimate at the first pixel location and a product of the maximum activity value at the plurality of pixel locations in the second region, the ring parameter and a multiplicative constant, which may be denoted C, may be computed 912. The mosquito-noise estimate at the first pixel location may be set 914 to the computed combined value. In some embodiments of the present invention, the combination may be the maximum of the statistic of the noise estimates at the plurality of pixel locations in the first region, the noise estimate at the first pixel location and the product of the maximum activity value at the plurality of pixel locations in the second region, the ring parameter and the multiplicative constant. In alternative embodiments, the combination may be a linear combination of the values.

In some embodiments of the present invention, a mosquito-noise estimate determined in accordance with FIG. 30 may be used to adjust one or more of the filtering parameters 705,707, 709 in the exemplary embodiments of the present invention depicted in FIG. 29. In some embodiments, one or more of the filtering parameters 705,707, 709 may be set to the mosquito-noise estimate. In alternative embodiments, one or more of the filtering parameters 705,707, 709 may be set to the maximum of the mosquito-noise estimate and a second value, wherein the second value is a predetermined value.

In some embodiments of the present invention, a mosquito-noise estimate determined in accordance with FIG. 31 may be used in to adjust one or more of the filtering parameters 705,707, 709 in the exemplary embodiments of the present invention depicted in FIG. 29. In some embodiments, one or more of the filtering parameters 705,707, 709 may be set to the mosquito-noise estimate. In alternative embodiments, one or more of the filtering parameters 705, 707, 709 may be set to the maximum of the mosquito-noise estimate and a second value, wherein the second value is a predetermined value.

Some embodiments of the present invention may comprise a computer program product comprising a non-transitory, computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for estimating mosquito noise at a first pixel location in an image, said method comprising:
computing a ring parameter for the image;
receiving a noise estimate for the first pixel;
computing a maximum of respective activity values for a second region including the first pixel location; and
estimating mosquito noise at the first pixel location as the maximum of:
the noise estimate for the first pixel, and
a product of the ring parameter, the maximum activity value, and a multiplicative constant.

2. The method as described in claim 1, wherein computing the ring parameter for the image includes computing the ring parameter for the image based on an additive-noise estimate for the image and a compression-noise estimate for the image.

3. The method as described in claim 1, wherein the noise estimate for the first pixel is the average of noise estimates for each pixel included in a first region including the first pixel.

4. The method as described in claim 3, wherein the first region is a square region centered on the first pixel location.

5. The method as described in claim 1, wherein the second region is a square region centered on the first pixel location.

6. The method as described in claim 1, wherein computing the maximum of respective activity values for the second region comprises computing an activity value corresponding to each pixel location in the second region and wherein computing an activity value corresponding to a pixel location includes computing a standard-deviation value of a plurality of pixel values in a corresponding region including the pixel location.

7. The method as described in claim 1, wherein the image is an image selected from the group consisting of a luminance image, an R-channel image, a G-channel image, a B-channel image and a chrominance image.

8. The method as described in claim 1, wherein the multiplicative constant is based on the maximum activity value.

9. The method as described in claim 1, wherein the multiplicative constant is a first constant value when the maximum activity value meets a first criterion and the multiplicative constant is a second constant value when the maximum activity value does not meet the first criterion.

10. The method as described in claim 1, wherein:
the multiplicative constant is a first constant value when the maximum activity value is less than a first threshold value;
the multiplicative constant is a second constant value when the maximum activity value is greater than a second threshold value; and
the multiplicative constant is a third constant value when the maximum activity value is between the first threshold value and the second threshold value.

11. The method as described in claim 1, wherein:
the multiplicative constant is a first constant value when the maximum activity value is less than a first threshold value;
the multiplicative constant is a second constant value when the maximum activity value is greater than a second threshold value; and
the multiplicative constant varies smoothly between the first constant value and the second constant value when the maximum activity value is between the first threshold value and the second threshold value.

12. The method as described in claim 1, wherein:
the multiplicative constant is a first constant value when the maximum activity value is less than a first threshold value;
the multiplicative constant is a second constant value when the maximum activity value is greater than a second threshold value; and
the multiplicative constant varies smoothly between the first constant value and a third constant value when the maximum activity value is between the first threshold value and the second threshold value, wherein the third constant value is greater than the first constant value and less than the second constant value.

13. A non-transitory computer-readable medium encoded with a computer program code for implementing a method for estimating additive noise in an image, said method comprising:
computing a ring parameter for the image;
receiving a noise estimate for the first pixel;
computing a maximum of respective activity values for a second region including the first pixel location; and
estimating mosquito noise at the first pixel location as the maximum of:
the noise estimate for the first pixel, and
a product of the ring parameter, the maximum activity value, and a multiplicative constant.

14. The non-transitory computer-readable medium as described in claim 13, wherein computing the ring parameter for the image includes computing the ring parameter for the image based on an additive-noise estimate for the image and a compression-noise estimate for the image.

15. A non-transitory computer-readable medium as described in claim 13, wherein the multiplicative constant is based on the maximum activity value.

16. The non-transitory computer-readable medium as described in claim 13, wherein the noise estimate for the first pixel is the average of noise estimates for each pixel included in a first region including the first pixel.

17. The non-transitory computer-readable medium as described in claim 16, wherein computing the maximum of respective activity values for the second region comprises computing an activity value corresponding to each pixel location in the second region and wherein computing an activity value corresponding to a pixel location includes computing a standard-deviation value of a plurality of pixel values in a corresponding region including the pixel location.

18. A method for estimating mosquito noise for a pixel of interest in an image, the method comprising:
   computing a ring parameter for the image;
   for each pixel included in an region including the pixel of interest, computing a respective activity value;
   computing a maximum of the respective activity values; and
   estimating mosquito noise for the pixel of interest as the product of the ring parameter, the maximum of the respective activity values, and a multiplicative constant.

19. The method of claim 18, wherein computing a respective activity value includes computing a standard-deviation value of pixel values in a respective N×N region corresponding to a pixel.

20. The method of claim 19, wherein a respective region respective N×N region corresponding to the pixel is centered on a location of the pixel.

21. The method of claim 20, wherein computing the ring parameter for the image includes computing the ring parameter for the image based on an additive-noise estimate for the image and a compression-noise estimate for the image.

22. The method of claim 20, wherein the multiplicative constant is a first constant value when the maximum activity value meets a first criterion.

* * * * *